(12) United States Patent
Takagi et al.

(10) Patent No.: US 7,058,695 B2
(45) Date of Patent: Jun. 6, 2006

(54) SYSTEM AND MEDIA FOR SIMPLIFYING WEB CONTENTS, AND METHOD THEREOF

(75) Inventors: Hironobu Takagi, Tokyo-to (JP); Chieko Asakawa, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 467 days.

(21) Appl. No.: 09/682,145

(22) Filed: Jul. 26, 2001

(65) Prior Publication Data
US 2002/0065842 A1    May 30, 2002

(30) Foreign Application Priority Data
Jul. 27, 2000    (JP) .............................. 2000-227996

(51) Int. Cl.
*G06F 15/16* (2006.01)
(52) U.S. Cl. .................. 709/217; 709/219; 715/501.1; 715/513
(58) Field of Classification Search .............. 709/245, 709/217, 219; 715/501.1, 513; 707/2, 3, 707/6, 10
See application file for complete search history.

(56) References Cited

U.S. PATENT DOCUMENTS

| | | | | |
|---|---|---|---|---|
| 5,781,785 A | * | 7/1998 | Rowe et al. ................. | 715/513 |
| 5,941,944 A | * | 8/1999 | Messerly ..................... | 709/203 |
| 6,049,821 A | * | 4/2000 | Theriault et al. ........... | 709/203 |
| 6,366,650 B1 | * | 4/2002 | Rhie et al. ............... | 379/88.13 |
| 6,415,278 B1 | * | 7/2002 | Sweet et al. ................... | 707/2 |
| 6,442,523 B1 | * | 8/2002 | Siegel ........................ | 704/270 |
| 6,537,325 B1 | * | 3/2003 | Nishizawa ................... | 715/530 |
| 6,553,412 B1 | * | 4/2003 | Kloba et al. ................. | 709/219 |
| 6,665,837 B1 | * | 12/2003 | Dean et al. ............... | 715/501.1 |
| 6,718,015 B1 | * | 4/2004 | Berstis ..................... | 379/88.17 |
| 2002/0111966 A1 | * | 8/2002 | Fukuda et al. .............. | 707/513 |
| 2002/0164000 A1 | * | 11/2002 | Cohen et al. ............. | 379/88.17 |
| 2002/0198720 A1 | * | 12/2002 | Takagi et al. ............. | 704/270.1 |
| 2004/0230905 A1 | * | 11/2004 | Asakawa et al. ........... | 715/517 |
| 2005/0050044 A1 | * | 3/2005 | Takagi et al. ................... | 707/6 |

FOREIGN PATENT DOCUMENTS

| | | |
|---|---|---|
| JP | 10-240604 | 9/1998 |
| JP | 2000-148642 | 5/2000 |
| JP | 2002-518726 | 6/2002 |
| WO | WO 99/66385 | 12/1999 |

\* cited by examiner

OTHER PUBLICATIONS

"Dharma Transcoding" technique as described in "http://www9.org/w9cdrom/169/169.html", "DiffWeb" (difference) technique as described in "http://www.diffweb.com/", "HTML Diff" described in "http://www-db.stanford.edu/c3/c3.html", "Mindit" described in "http://mindit.netmind.com/mindit.shtml."

*Primary Examiner*—Marc D. Thompson
*Assistant Examiner*—Joseph Maniwang
(74) *Attorney, Agent, or Firm*—Gibb I.P. Law Firm, LLC; Eustus Nelson

(57) ABSTRACT

A technique for the simplification of Web pages in order to access necessary information rapidly, when displaying or outputting Web pages using a small screen device or a voice browser. A method for simplifying Web contents includes the steps of acquiring a target page subject to simplification, acquiring adjoining pages that adjoin the target page and performing a difference operation to delete objects that are common among the target page and the adjoining pages from the target page to generate a simplified page.

25 Claims, 22 Drawing Sheets

FIG. 11

(a)
Other news of the same genre

- Semiconductor manufacturers actively investing in prospect of increased digital demand (14 : 15)
- Japan's Solar battery production No. 1 in the world beyond US (12 :50)
- Unification of business accounting rules. Japan fears initiative of the US and Europe (11 : 12)
- Tax and utility bill payments enabled with TEL and Network (23 : 37)
- TTNet starts cheap service targeting school from May (20 : 24)
- Renault, France takes over Samsong Automobile (13 : 33)

(b)
- Semiconductor manufacturers actively investing in prospect of increased digital demand (14 : 15)
- Unification of business accounting rules. Japan fears initiative of the US and Europe (11 : 12)

(c)
Other news of the same genre

- Semiconductor manufacturers actively investing in prospect of increased digital demand (14 : 15)
- Unification of business accounting rules. Japan fears initiative of the US and Europe (11 : 12)

Jump to Form6
emailform

Last from

Jump to Form7
pathfinder

April 22, (b)

Keyword ▼ go!

Search

CNN.com ▼

Find

FIG. 17

SYSTEM AND MEDIA FOR SIMPLIFYING WEB CONTENTS, AND METHOD THEREOF

BACKGROUND OF THE INVENTION

1. Field of the Invention

The present invention relates to a method and system for simplifying Web contents, and more particularly to a technique for simplifying the contents on the fly, even in the case of Web pages which do not have history information or whose URL (Uniform Resource Locator) changes day by day.

2. Background of the Invention

In recent years, the use of the Internet has become popular because of the progress of network technologies and improvement of functions of an information apparatus and the lowering cost trend. Since the detailed information transmission can be performed at a low cost without regard to corporations and individuals and further without conscious of borders, Web pages as a source of information transmission are increasing explosively day by day. Furthermore, vast amounts of information are updated under the control of administrators of Web pages. In this context, the Internet and Web pages utilizing the same are becoming an important information gathering media which takes the place of conventional broadcasts and mass media or which compensates for them.

By the way, the role of Web pages are diversifying. For example, without staying in a mere information transmission, business transactions (electronic commerce) via Web pages and collaborations using Web pages are being performed. In order to implement these diversified functions, there are provided Web pages which have a higher convenience. Also, in order to access the intended information more rapidly, there are incorporated functions in the Web pages which improve user operability of, for example, a search screen. Examples are a link list that is used in common in the site, an image map, or a form, etc. These are included in every page and provide functions that are very convenient for general users.

However, these general Web pages are designed on the premise of a desktop type of computer screen. That is, their layouts are considered in view of the size of a desktop computer screen. Hence, in case of a device with a small screen (hereinafter referred to as small screen device) such as PDA (Personal Digital Assistant) and cellular phones, or a software which reads aloud a Web page (hereinafter referred to as voice browser), there is a problem that one can not reach necessary information quickly. Namely, concerning the general Web pages, a form and image map are laid out at the top of the page, so it is necessary, in case of a small screen device, to repeat a display of these forms and others many times to reach the necessary information. Also in case of the voice browser, necessary information is read aloud after these forms and others have been read aloud. The small screen device generally does not need visual multi-functionality like a desktop computer, whereas the voice browser does not need visual functions for improving operability. On the contrary, these visual functions form an obstacle to the small screen device and voice browser.

Therefore, there is attempted a technique of simplification for omitting a part of Web pages, for example, the "Dharma Transcoding" technique as described by Masahiro Hori et al. or the "DiffWeb" (difference) technique.

The "Dharma transcoding" technique is a technique which divides an existing Web page into several pages in a condition similar to an original layout and to create a page that is easily displayed to a small screen device. This technique needs external annotation information which gives a detailed description of a structure of pages and significance of each part.

The "Diffweb" technique is a technique that caculates and presents a difference between a Web page that was registered in advance and saved and a current Web page. According to this technique, a list of pages can be registered per user and a difference of these pages can be calculated. With this difference technique, all of the processing such as page registration, storage, and difference operation is performed by a direction from users.

However, the "Dharma transcoding" technique needs the annotation information, as described above. To give the annotation information, there is needed interposition such as a volunteer, so that it is difficult to automate completely.

With the "DiffWeb" technique, page registration, storage, and difference operation are processed according to a direction from a user, as described above. Thus, the difference operation can not be performed as on-the-fly processing. Also, concerning the pull-down menu, it is feared that a character string as contents is deleted and the form after simplification can not work well.

Moreover, according to the prior techniques, the simplification is implemented by calculating a difference against a comparative page which has been saved in advance. Therefore, the following problems exist.

First, if the comparative page has not been saved in advance, the simplification can not be performed. That is, only a page that has a comparative page recorded can become a target for simplification, so that the page that appears first can not be subject to simplification.

Secondly, even if the comparative page has been saved, a page whose URL changes day by day can not be simplified. For example, an article page of the Asahi Shinbun (www.asahi.com) includes the date in the URL, as follows, i.e., "http://www.asahi.com/0530/news/business30010.html". In this case, there is no past page that has the same URL, therefore, the simplification can not be performed.

Thirdly, even the necessary information might be deleted. For example, important information such as a title of link lists or a form might be deleted. On the contrary, unnecessary subtle changes in character strings might be saved.

It is therefore a feature of the present invention to provide a technique for the simplification of Web pages in order to access necessary information rapidly, when displaying or outputting Web pages using a small screen device or a voice browser.

It is another feature of the invention to provide a technique for performing the simplification of Web pages even if there is no past page of the same URL.

It is further feature of the invention to provide a technique for performing simplification of Web pages on the fly.

It is a still further feature of the invention to provide a technique for simplifying unnecessary information with high precision, without losing important information upon simplification of Web pages.

SUMMARY OF THE INVENTION

Specifically, a feature of the present invention comprises the method steps of acquiring a target page subject to simplification, acquiring adjoining pages that adjoin the target page, and performing a difference operation to delete objects that are common among the target page and the adjoining pages from the target page to generate a simplified page.

Various other objects, features, and attendant advantages of the present invention will become more fully appreciated as the same becomes better understood when considered in conjunction with the accompanying drawings, in which like reference characters designate the same or similar parts throughout the several views.

BRIEF DESCRIPTION OF THE DRAWINGS

FIG. 11 is a diagram showing a display of the page of FIG. 10 using the system of the present invention.

FIG. 16 shows an example of restoration performed by the list title restoration module 64.

FIG. 17(a) depicts a diagram where the links to the moved forms are left at original positions where they existed, whereas FIG. 17(b) shows a form that is moved to the bottom of the page.

DETAILED DESCRIPTION

Figure 1:
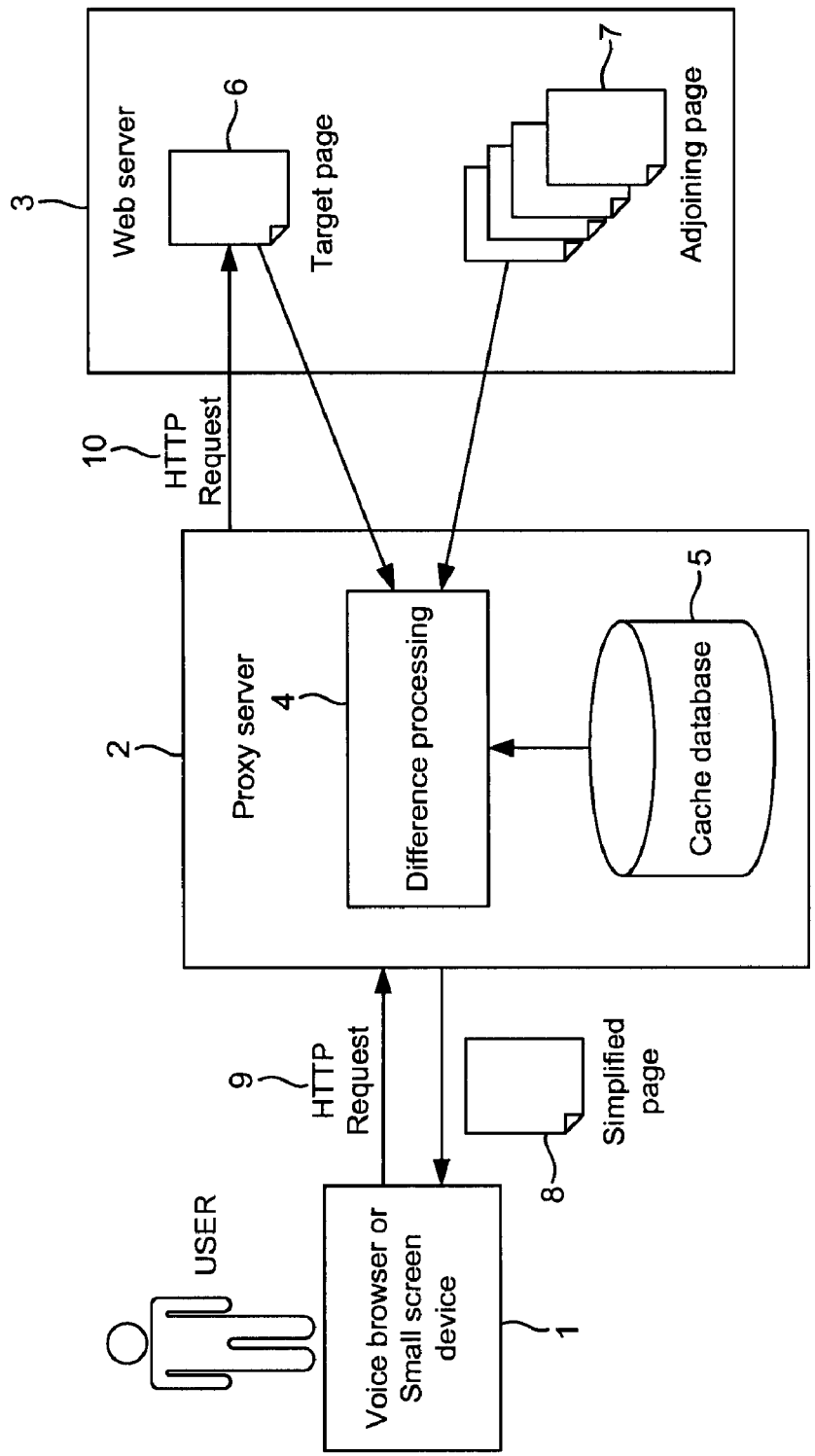
FIG. 1 depicts a schematic diagram of the first embodiment of the present invention.

The present invention provides a technique for transforming to a page on the fly that is easy to read with a voice browser and a small screen device, on the basis of the difference operation. "The difference operation" means, for example, the operation for calculating the differences between two HTML documents. The difference operation that is used in the simplification of a Web page, according to the present invention, uses not only a past page having the same URL but also adjoining pages, as a comparative page with which a target page subject to simplification is compared. According to the comparison, it retrieves only the information that has been updated, and removes the template information in common for each page of the site. Hereby, only the main contents of the page subject to simplification are retrieved.

According to the present invention, adjoining pages for comparison are automatically acquired, so the simplification of the Web pages can be performed on the fly even if there is no stored information of the past page. Hereby, a quick access to necessary information is possible when using a small screen device or a voice browser.

The adjoining pages comprise pages of URLs whose directory or parent directory is common with the URL of the target page or the URL of the links included in the target page; a top page of each directory under the root directory of the target page; a past page of the target page; pages of the links included in the past page; or past pages of the adjoining pages.

It is possible to prioritize URLs of the adjoining pages after acquiring the adjoining pages, wherein the prioritizing is determined based on the edit distance between the URL of the target page and the URLs of the adjoining pages, or the relevance among URLs based on the number of co-occurrence or the number of cross-reference between the target page and the adjoining pages.

In said difference operation, DP matching can be used to determine whether the objects are common or not, and also the significance of the objects included in the target page is calculated. If the significance exceeds a predetermined threshold, the objects are not deleted even if they are common with the objects of the adjoining pages. On the contrary, objects with low significance are deleted.

The significance is represented by the sum of weighted feature values. The feature values comprising the character size of the objects, a numerical value assigned to fonts and other character attributes, a numerical value to identify whether the objects are the banner, a displacement value of the objects from the center of the screen, the number of keywords included in the objects, a numerical value assigned to the information indicating whether the objects are added or updated, the ratio of updated characters of the objects, a numerical value assigned to the information indicating whether the objects are one character, a numerical value assigned to the tag class of the objects, etc.

Further, the post-processing can be done after the difference operation, which includes restoration of the list title, restoration of information at the top of or on the side of table, movement of the form to the rearward of the page, or reference of annotation information.

It is also possible to receive a request from a user terminal, then performing each of said steps in response to the request to select a simplified page which has the least amount of information among the simplified pages, and sending the selected simplified page to the user terminal. The user terminal can be a computer system in which a voice browser operates or an information terminal which has a display with a small screen. Alternatively, the user terminal or a computer system connecting to the user terminal may provide a voice recognition function and voice synthesis function, wherein a request is input by voice and the simplified page is output by voice.

Now the present invention will be described with reference to the accompanying drawings.

However, the present invention is implemented with various forms, so it is not limited to the embodiments described herein. Note that the same elements are referred to with the same reference numbers through the drawings.

In the following embodiment, the present invention will be described as a method and system, however, it is also implemented as a medium in which a program for use with a computer is recorded. Therefore, the present invention can take the form of hardware, the form of software, and the combination thereof. As a medium recording a program, any computer-readable medium is included, for example, a hard disk, CD-ROM, optical storage device, magnetic storage device, etc.

Also, in the following embodiments, a typical computer system is available. It includes a CPU, a main memory (RAM), a nonvolatile storage (ROM), etc., all of which are interconnected by bus. Further, a co-processor, an image accelerator, a cache memory, and an input-output (I/O) controller may be connected to the bus. In addition, an external storage, a data input device, a display device, a communication controller, etc., are connected via interface. Needless to say, it is possible to provide hardware resources that are typically equipped for a computer system. A representative external storage is a hard disk drive, however, an optical semiconductor storage such as a magneto-optical disk, an optical storage, and a flash memory is also included. A data input device includes an input device such as a keyboard and a pointing device such as a mouse. A data input device further includes an image reader such as a scanner, and also a voice input device. A display device includes a CRT, an LCD, a plasma display device, etc. A computer system includes a variety of computers such as a personal computer, a work station, a mainframe computer, etc.

The first embodiment of the present invention:

FIG. 1 depicts a schematic diagram of the first embodiment of the present invention. A system according to this embodiment includes a user terminal 1, a proxy server 2, and a Web server 3 where Web pages exist.

The user terminal 1 is a computer system where a voice browser operates or a small screen device which has a display device with a small screen. The voice browser is a software which has a function for browsing information (documents) acquired by using HTTP (HyperText Transfer Protocol) by voice, wherein such information comprises HTML (HyperText Markup Language) documents or XML (extensible Markup Language) documents. The small screen device is an information terminal such as an i-mode cellular phone and a PDA, which have a display screen much smaller than that of desktop computers. When reading aloud the acquired documents using the voice browser or displaying them on the small screen device, it gets in the way of reading aloud or displaying to apply the Web contents intact which are laid out for desktop computers. The object of the system of the embodiment is to read aloud or to display the acquired information smoothly even in such a user terminal 1. In particular, for a visually handicapped person who is supposed to be a user of a voice browser, he or she can obtain an information acquiring means that is similar to a person who does not have visual handicaps. The present invention provides a means for securing an equal opportunity to access information, thus the social significance is great.

The proxy server 2 has a function of the difference processing 4 for simplifying the Web pages, in addition to the typical functions of a proxy server. The function of the difference processing 4 will be described later. In the difference processing 4, the cache database 5 is referred to. The cache database 5 stores Web pages which the proxy server 2 accessed in the past. Note that the embodiment shows the example where the Web pages that are simplified using the proxy server 2 are displayed or output by voice, a simplification function (function of the difference processing 4) may be provided at each client (user terminal 1) or the Web server 3. While the cache database 5 is shown to be in a system of the proxy server 2, the cache database 5 is not necessarily in the proxy server 2. For example, its location can be specified by URL or IP address, so it may be in other systems insofar as the server can access in its operational state. Such other systems include a system which connects to LAN or WAN, and a system which is connected via the Internet. The cache database 5 is a conceptual thing, so it may be processed in a distributed manner by storage devices that are located in physically different locations (addresses). The same thing is applied to other databases described below.

The Web server 3 has a target Web page 6. Generally, the Web server 3 is assumed to be connected to the Internet, but it is not necessarily connected to the Internet and is enough to be a server to respond to an HTTP request. For example, it may be the server on a variety of networks such as an intranet and an extranet of organizations such as a corporation.

The Web server 3 has adjoining pages 7 that adjoin the target page 6. The adjoining pages 7 will be described later. Generally, the adjoining pages 7 include objects such as forms, link lists and image maps, which are common with the target page 6, and the simplification of Web pages is performed by deleting these common objects from the target page. Note that past pages that are recorded in the cache database 5 are used as a candidate for comparative page as well as adjoining pages 7 in the embodiment of the present invention, however, past pages are not the essential constructional requirements of the present invention. The present invention can perform the simplification using the current adjoining pages 7 even if there is no past page of the target page 6.

According to the embodiment of the present invention, a user specifies an address of the proxy server 2 in setting the proxy server of the user terminal 1. The user can display or output the simplified Web page 8 by accessing the Web server 3.

The function of the processing of the present system is as follows. The user terminal 1 specifies the address of the Web server 3 to issue an HTTP request 9. In response to the request 9 from the user terminal 1, the proxy server 2 issues an HTTP request 10 to the Web server 3. The proxy server 2 performs the difference processing 4 by referring to the target page 6, adjoining pages 7, and past pages in the cache database 5 if needed, then send back the simplified page 8 as a response to the request 9. The user terminal 1 displays the simplified page 8 or outputs by voice. With such a simplification method, it is possible to delete common objects of the target page 6 and the user can get necessary information rapidly. Since the simplified page is read aloud, the user can hear the necessary (or important) information smoothly without feeling stress. In particular, since a visually handicapped person can not recognize the Web page visually, he or she can acquire information smoothly according to the simplification of the present invention. Hereinafter, the difference processing will be described in detail.

Figure 2:
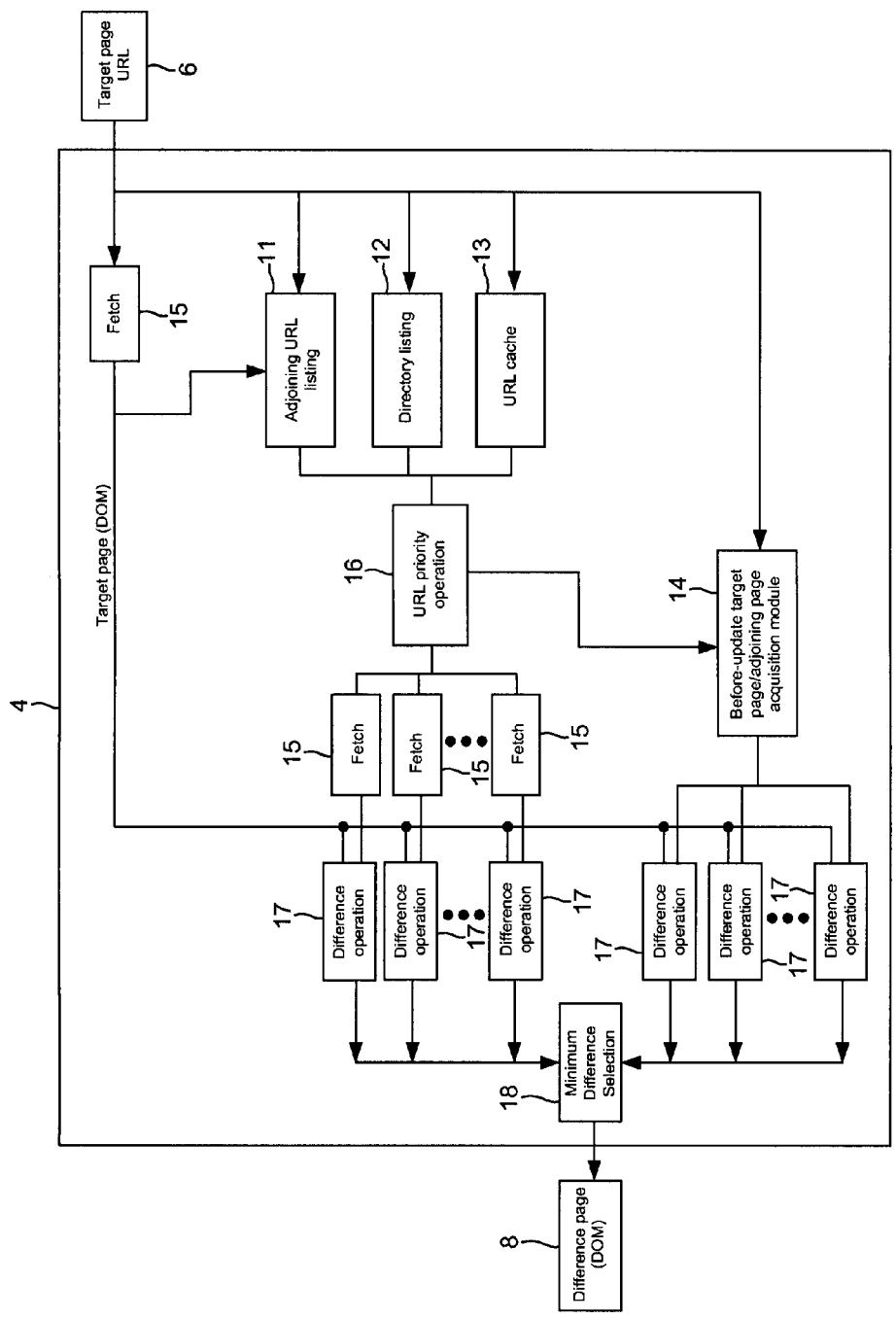
FIG. 2 is a block diagram specifically illustrating the difference processing 4.

FIG. 2 is a block diagram specifically illustrating the difference processing 4. The difference processing module according to the embodiment of the present invention includes an adjoining URL listing module 11, a directory listing module 12, a URL cache module 13, a before-update target page/adjoining page acquisition module 14, a fetch module 15 which acquires Web pages and outputs objects in accordance with DOM (Document Object Model), a URL priority operation module 16, a difference operation modules 17, and a minimum difference selection module 18. The difference processing according to the embodiment automatically detects pages that are appropriate as a subject for comparison in the difference operation in relation to the target page, and calculates the difference. According to the embodiment, introducing the concept of adjoining pages, extraction of the difference is possible even if past pages have not been saved or the URL changes day by day. At the same time, a template that is used in common in the site, such as a header, a form, a link list, etc., is able to be removed for any page. Note that an adjoining page refers to a page which may include a common object with ones that are included in the target object, including a page that exists in the same directory on the server, a page having the same parent directory, a top page of the directory, a top page of the site, etc. In the embodiment of the present invention, a difference against these adjoining pages is also calculated, then the difference which makes the character string shortest is selected among them, thereby enabling the simplification of the Web pages on the fly.

Figure 3:
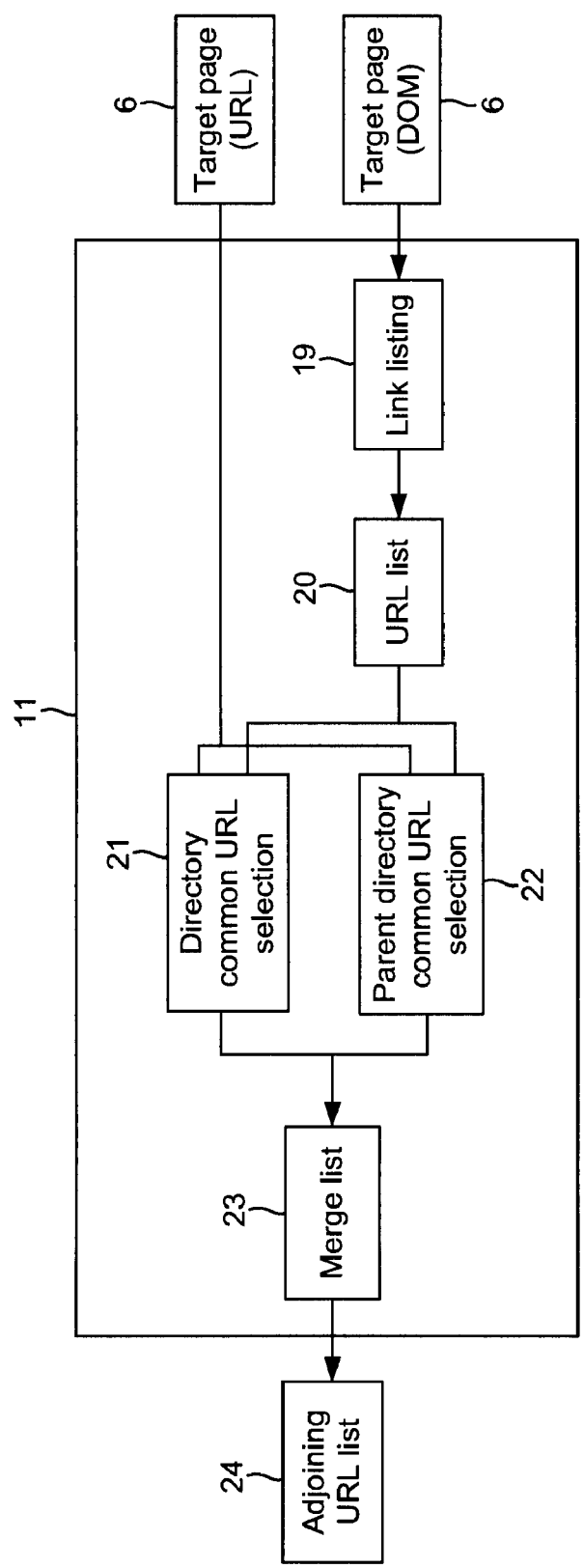
FIG. 3 is a block diagram specifically illustrating the adjoining URL listing module 11.

Adjoining URL Listing Module:

FIG. 3 is a block diagram specifically illustrating the adjoining URL listing module 11. The adjoining URL listing module 11 is a module which analyzes the target page 6 to acquire a list of pages located nearby in the site (i.e., adjoining pages). Since these pages (i.e., adjoining pages 7) tend to have the same link list or image maps as the target page 6, the simplification of the target page 6 is able to be performed by deleting common objects of these adjoining pages.

The adjoining URL listing module 11 includes a link listing module 19, a URL list 20, a directory common URL selection module 21, a parent directory common URL selection module 22, and a list merge module 23.

First, in response to the request from the proxy server 2, contents are fetched from the target page 6 (the fetch module 15 in FIG. 2). Next, from the objects (DOM) of the target page that have been acquired by fetching, URLs included in the target page 6 are listed (the link listing module 19). For URL listing, href attributes of <a> tags are referred to, for example. Thus, the URL list 20 is obtained as a result of the link listing module 19. Among the URL lists 20, a URL that refers to the same directory as the target page 6 is selected, thereby a new list is created (the directory common URL selection module 21). Further, a directory that has the same parent directory is selected to create a new list of URLs (the parent directory common URL selection module 22). Finally, these lists are merged by the merge module 23 to generate the adjoining URL list 24. As described later, the fetch module 15 is operated for each URL to be used for difference operation.

Which list of these modules 21, 22 is more effective depends on the structure of each site. For example, in "www.asahi.com", the directory common URL selection module 21 is effective, whereas in "www.cnn.com", the parent directory common URL selection module 22 is effective. Like this, since the effective method changes depending on the structure of the sites, more effective comparative page for the page simplification is able to be acquired by listing both lists.

Now an example of URL selection will be described below.

(1) Directory common URL selection:
URL of the target page:
http://www.asahi.com/0606/news/national06015.html
URLs listed (a part):
http://www.asahi.com/a0606/news/national06012.html
http://www.asahi.com/0606/news/national06013.htm
http://www.asahi.com/0606/news/national06014.html (2) Parent directory common URL selection:
URL of the target page:
http://www.cnn.com/2000/US/06/05/sea.based.defence/index.html
URLs selected (a part):
http://www.cnn.com/2000/US/06/05/dday.remenbrance/index.html
http://www.cnn.com/2000/US/06/05/helicopter.escape.03/index.html
http://www.cnn.com/2000/US/06/05/curbing.terrorism.02/index.html Directory Listing Module:

The directory listing module 12 creates a list of top pages of each directory from the URL of the target page 6. A large scale site might be divided into several top pages, wherein a comparative page would be effectively acquired when it includes the common link list as the target page. There is shown a concrete example below.

URL of the Target Page:
http://www.cnn.com/2000/US/06/05/helicopter.escape.03/index.html
URLs selected (a part):
http://www.cnn.com/2000/US/06/05/
http://www.cnn.com/2000/US/06/
http://www.cnn.com/2000/US/
http://www.cnn.com/2000/
http://www.cnn.com/

Figure 4:
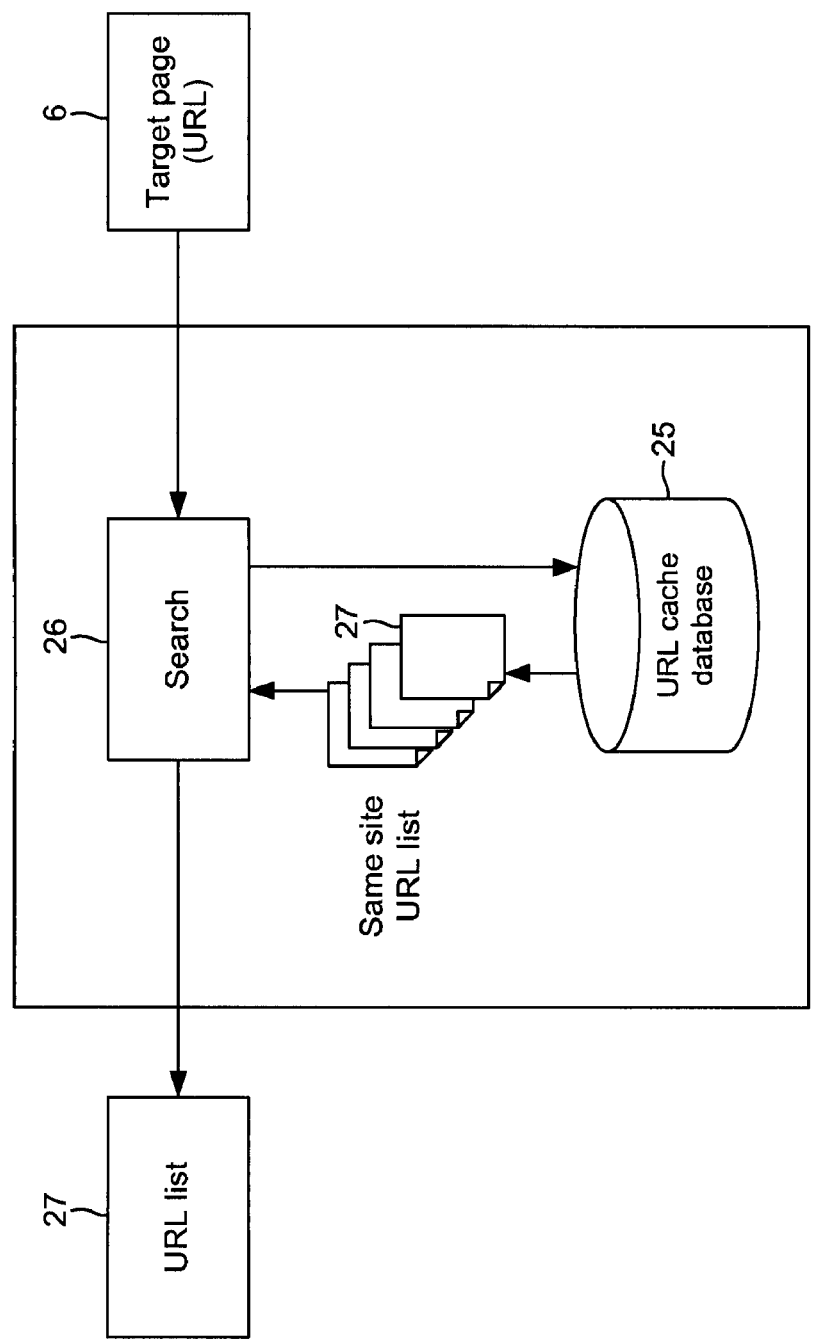
FIG. 4 is a schematic diagram of an example of the URL cache module 13.

URL Cache Module:

FIG. 4 is a schematic diagram of an example of the URL cache module 13. The URL cache module 13 includes a URL cache database 25 and a search means 26. The URL cache database 25 may be configured as a part of the cache database 5 of FIG. 1. The URL cache database 25 records the URLs of pages which the user of the proxy server 2 accessed in the past, and a list of URLs that are included in those pages. The search means 26 searches URLs in the cache in response to the URL of the target page 6 and lists the URL list 27 of the same site as the target page 6.

Using the URL cache module 13, one can acquire a URL similar to the URL of the target page, thereby increasing candidates of appropriate pages.

URL Priority Operation Module:

The URL priority operation module 16 calculates the similarity of URLs that were listed by the adjoining URL listing module 11, the directory listing module 12 and a URL cache module 13, and prioritizes those URLs. As described later, a page fetch is performed in the order of priorities. The URL priority operation module 16 puts an edit distance of URLs, the number of co-occurrence, and the number of cross-reference together, in order to reliably list a page whose layout is similar.

Figure 5:
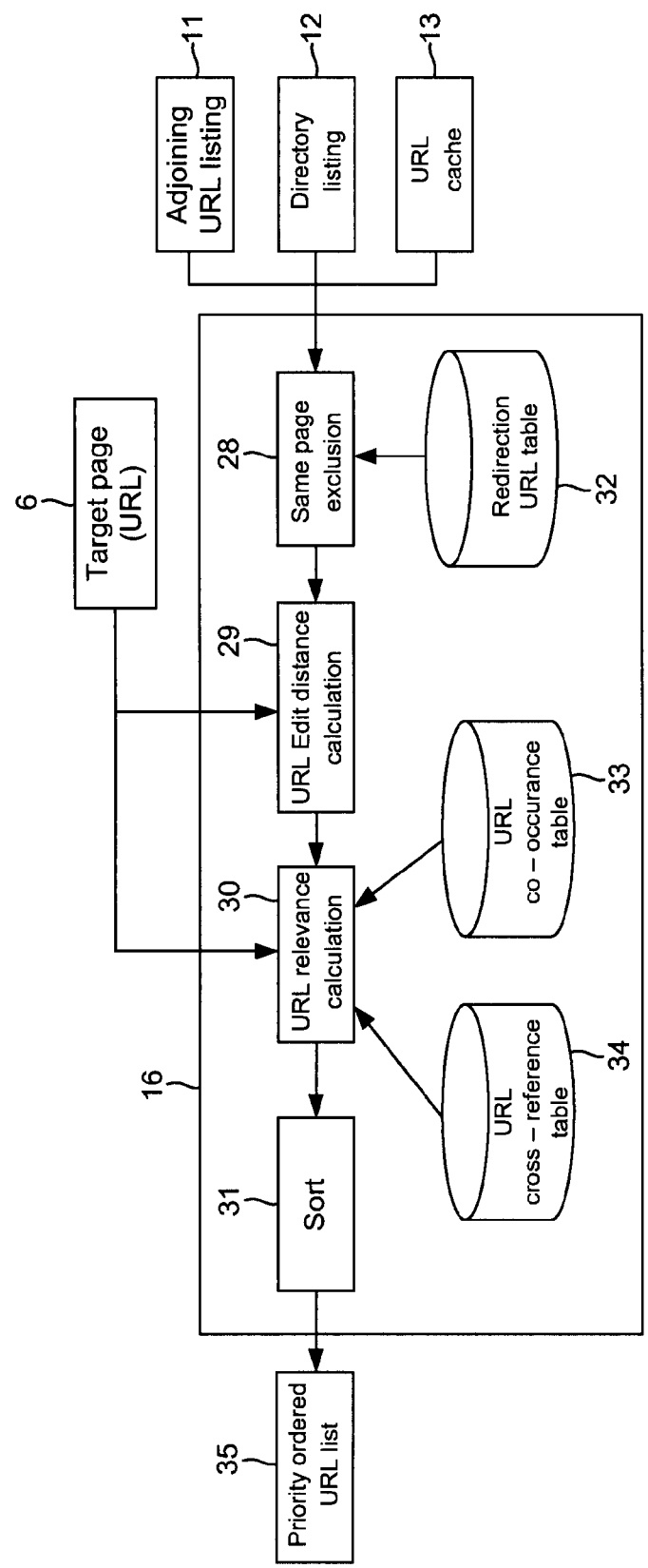
FIG. 5 is a block diagram showing an example of the URL priority operation module 16.

FIG. 5 is a block diagram showing an example of the URL priority operation module 16. The URL priority operation module 16 includes a same page exclusion module 28, a URL edit distance calculation module 29, a URL relevance calculation module 30, a sort module 31, a redirection URL table 32, a URL co-occurrence table 33, and a URL cross-reference table 34.

Next, the operation of the URL priority operation module 16 will be described. First, it integrates URLs that were listed by the adjoining URL listing module 11, the directory listing module 12 and a URL cache module 13 to generate one URL list. Then using the redirection URL table 32, the same page exclusion module 28 excludes the URLs referring to the same page. The redirection URL table 32 is maintained by each fetch module 15, as described later.

Next, the similarity is calculated between the target page 6 and each URL included in the list. The similarity is calculated by calculating an edit distance with the URL edit distance calculation module 29. For example, the edit distance is given by calculating the longest common string using DP matching and calculating the number of edit operations therefrom. The shorter the edit distance, the higher the similarity.

Next, the relevance of URLs is calculated using the URL relevance calculation module 30. The URL relevance calculation module 30 puts a value of edit distance, the number of cross-reference of URLs, and the number of co-occurrence of URLs together, in order to digitalize the relevance to the URL of the target page. The number of co-occurrence of URLs and the number of cross-reference of URLs are recorded in the URL co-occurrence count table 33 and the URL cross-reference table 34 respectively, and are always calculated and updated in the HTML parser (described later) in the fetch module 15. The URL relevance calculation module 30 performs a weighted addition of the number of cross-reference, the number of co-occurrence, and the edit distance to calculate each relevance of each URL.

Finally, the sort module 31 rearranges the lists in descending order to determine the priority. The determined priority is output as the priority ordered URL list 35.

Before-update target page/adjoining page acquisition module 14: The before-update target page/adjoining page acquisition module 14 is a module to select before-update pages of the target page 6 or its adjoining pages 7 as a subject of difference as well, when they exist in the cache database 5.

Figure 6:
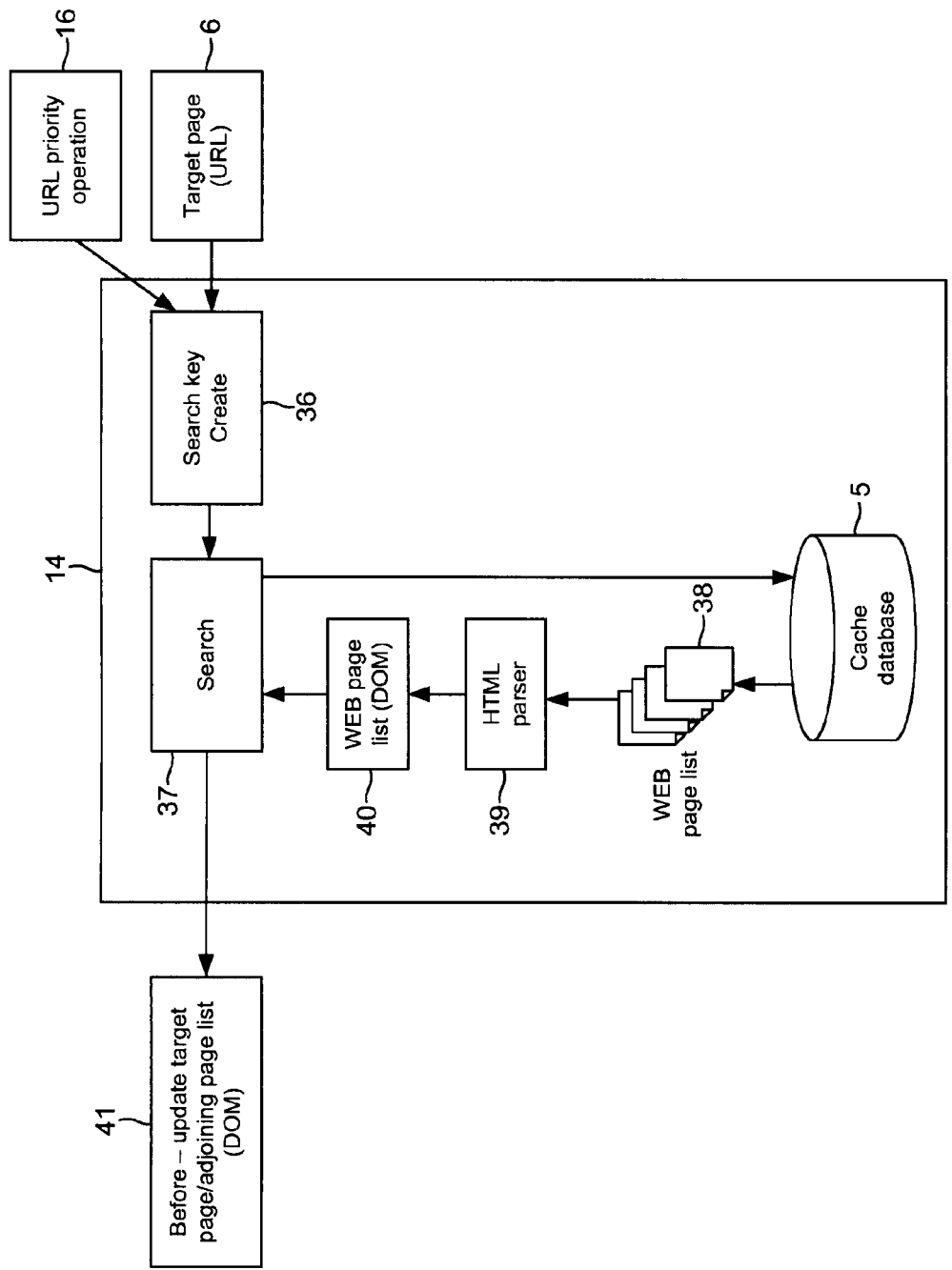
FIG. 6 is a schematic diagram showing an example of the before-update target page/adjoining page acquisition module 14.

FIG. 6 is a schematic diagram showing an example of the before-update target page/adjoining page acquisition module 14. This module includes a search key create module 36, a search module 37, and an HTML parser 39, wherein the aforementioned cache database 5 is referred too.

The search module 37 searches the cache database 5 to see if there is a past page of the URL list 35, which is sorted in the order of similarity by the URL priority operation module 16. If there is, the list 38 of Web pages which meet the search condition is extracted from the cache database 5, and a Web page list 40 (which is composed of DOM trees) is created from the HTML documents, using the HTML parser 39. Since there are recorded in the cache database 5 not only URL lists but the contents of Web pages, the before-update target page/adjoining page list 41 is obtained in the form of DOM trees. The obtained before-update target page/adjoining page list 41 is selected as a subject of difference of the target page 6.

The search key for the cache database 5 is generated in the search key create module 36. As a search key, there is used a URL string that is generated in the aforementioned directory listing module 12, in addition to the URL of the target page 6.

When the target page 6 includes "a query string" such as a search result of the search engine (i.e., a Web page whose main function is to search homepages), search results (URL) by other keywords could be also added to the search keys.

Figure 7:
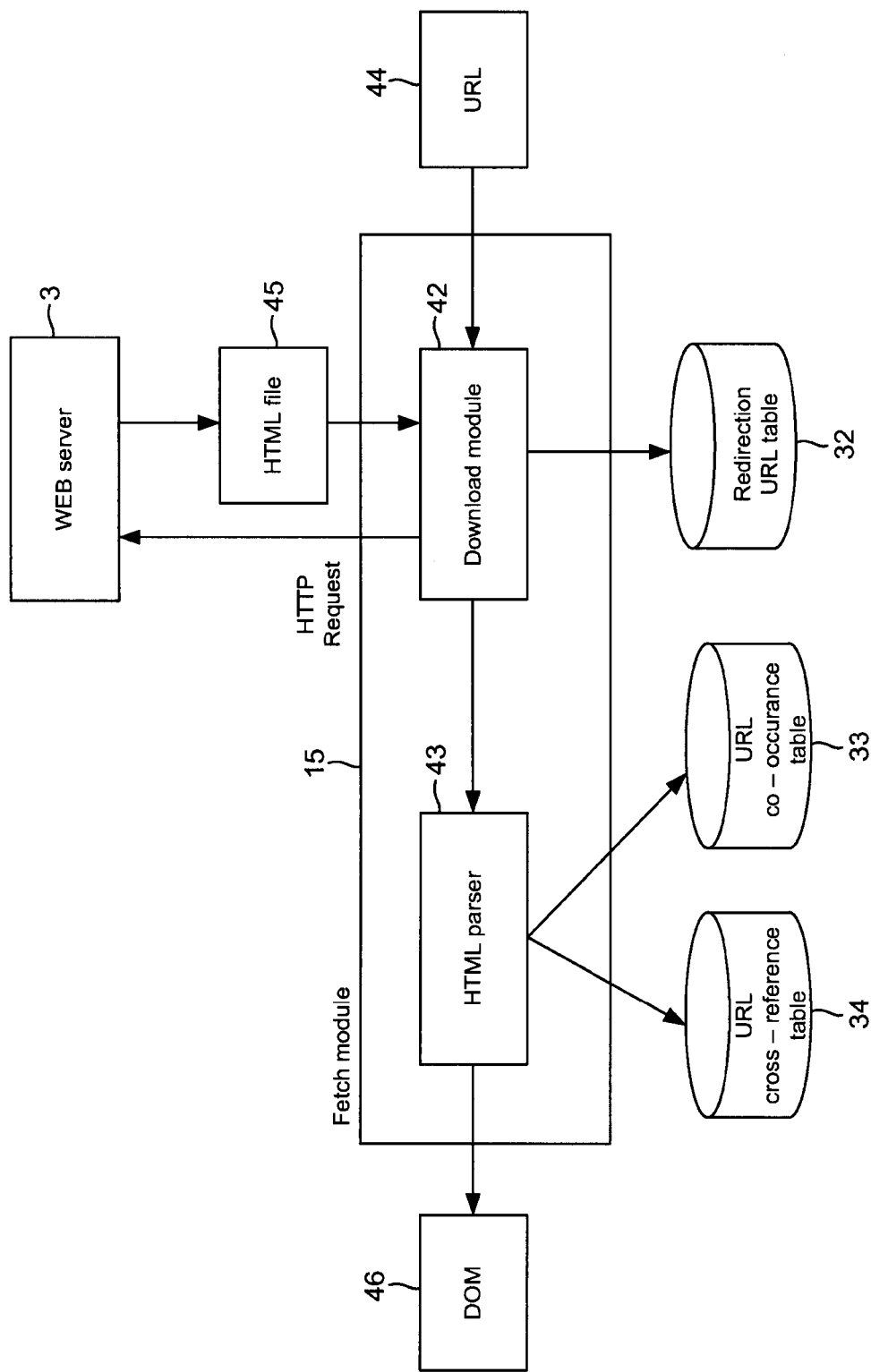
FIG. 7 is a schematic diagram of an example of the fetch module 15.

Fetch Module:

FIG. 7 is a schematic diagram of an example of the fetch module 15. The fetch module 15 includes a download module 42 and an HTML parser 43. In receipt of the URL input 44 to be fetched, the download module 42 issues an HTTP request to the Web server 3 of the input URL. In response to the request, the Web server 3 sends back an HTML file 45. Then, the download module 42 records the URL of the received HTML file to the redirection URL table 32. On the other hand, the HTML file 45 is sent to the HTML parser 43 to be transformed to the DOM tree 46. The HTML parser 43 calculates the numbers of co-occurrence and cross-reference, and records them to the URL co-occurrence count table 33 and the URL cross-reference table 34 respectively. These redirection URL table 32, the URL co-occurrence count table 33 and the URL cross-reference table 34 are performed maintenance by the fetch module 15 and are utilized by the aforementioned URL priority operation module 16.

Difference Operation Module:

The difference operation module 17 generates a DOM tree from the DOM tree of the target page 6 and the DOM tree of comparative pages selected by the aforementioned technique.

Figure 8:
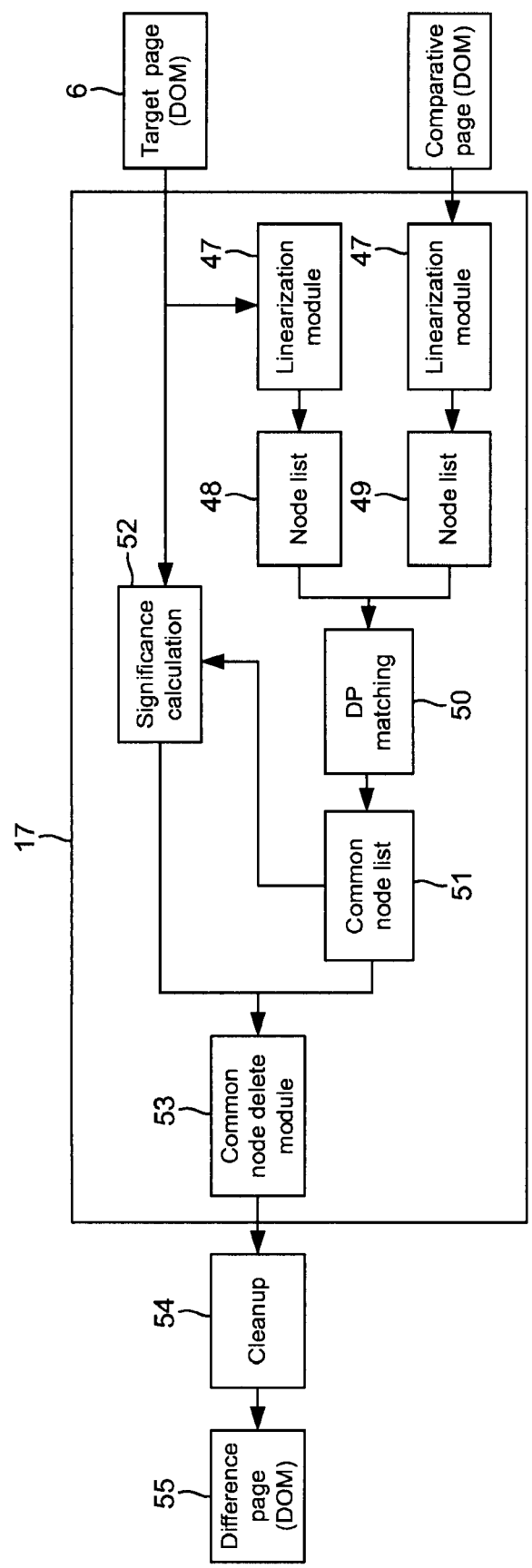
FIG. 8 is a block diagram of an example of the difference operation module 17.

FIG. 8 is a block diagram of an example of the difference operation module 17. The difference operation module 17 includes a linearization module 47, a DP matching module 50, a significance calculation module 52, and a common node deletion module 53. Each URL that was rearranged by the URL priority operation module 16 is transformed into a DOM tree by the fetch module 15. On the other hand, the list 41 that is acquired by the before-update target page/adjoining page acquisition module 14 needs not to be fetched, because it is generated in the form of DOM tree.

In this way, there are generated DOM trees of pages corresponding to the lists that are selected by each of the adjoining URL listing module 11, the directory listing module 12, the URL cache module 13, and the before-update target page/adjoining page acquisition module 14, wherein the DOM trees are one of the inputs to the difference operation as a subject of comparison for the target page 6. The DOM tree of the target page 6 becomes the other input to the difference operation.

In order to avoid important nodes from being deleted in the course of the difference process of the embodiment, the significance of nodes are calculated in advance in the significance calculation module 52, wherein the nodes whose significance exceeds some threshold are not deleted even if they are common nodes. Further, the nodes which have low significance are deleted in the next cleanup module 54, whereby only information which is specific to the page and has high significance is acquired.

Hereinafter, a technique using DP matching will be described in accordance with FIG. 8. First, the linearization module 47 creates node lists 48 and 49 from respective DOM trees of the target page and comparative pages. The linearization module 47 circulates DOM trees to select a text node and an image node. At this time, in order to prevent the form from being deleted, it is possible not to select nodes under the form node and to perform the processing of forms in the "post-processing" module, as will be described later in the alternative embodiments. Furthermore, it is possible not to select a comment node as well, in order to save the scripts of the client side (JavaScript, VBScript).

Next, the DP matching 50 is performed to two node lists, thereby calculating node lists that are included in common. Note that the DP matching is an algorithm for calculating the longest common string between two symbol strings. For example, "bcdgh" is output from "abcdefgh" and "bcdlgh". In the embodiment of the present invention, applying this algorithm to the node lists, a node list included in common (so-called longest common "node" string) is generated.

Significance Calculation Module:

In order to prevent important nodes (e.g., a character string indicating the title) from being deleted, the weighting is performed in advance for each of text node and image node of the target page. The common node deletion module 53 does not delete nodes when their weight exceeds the threshold.

A method for calculating the significance of nodes will be described below. It is evident that other methods for calculating the significance could also be applied. Here is shown a technique to determine the significance by means of the weighted sum of several feature values. The significance S of each node is calculated by the following formula.

$$S=\Sigma Wi*Pi$$

Where Pi is each feature value and Wi is the weighting for each feature value.

The following is an example of the feature values.

<Character size>

Assuming that the feature value Pi be the difference between the character size when rendered and a default font size.

$$Pi=size-default\ size$$

This is based on the empirical rules where the larger the character size is, the higher the significance is. The character attributes are also considered into the feature value Pi. In this case, they are added to the Pi depending on each attribute value. For example, when a font such as the bold or italic and the color such as red are specified, or when an underline or double underline is specified, the significance is supposed to be high, so that they are added to Pi depending on such an attribute.

<Removal of banner by template>

An image ring which has a high likelihood to be a banner has its significance lowered. A banner template makes an image size, a character string of the link destination (/doubleclick/, /ads/, etc.), and an immediately following link string (Click Here, etc.) be a criterion. A distance from the template can be made a feature value Pi.

<Node position>

Figure 9:
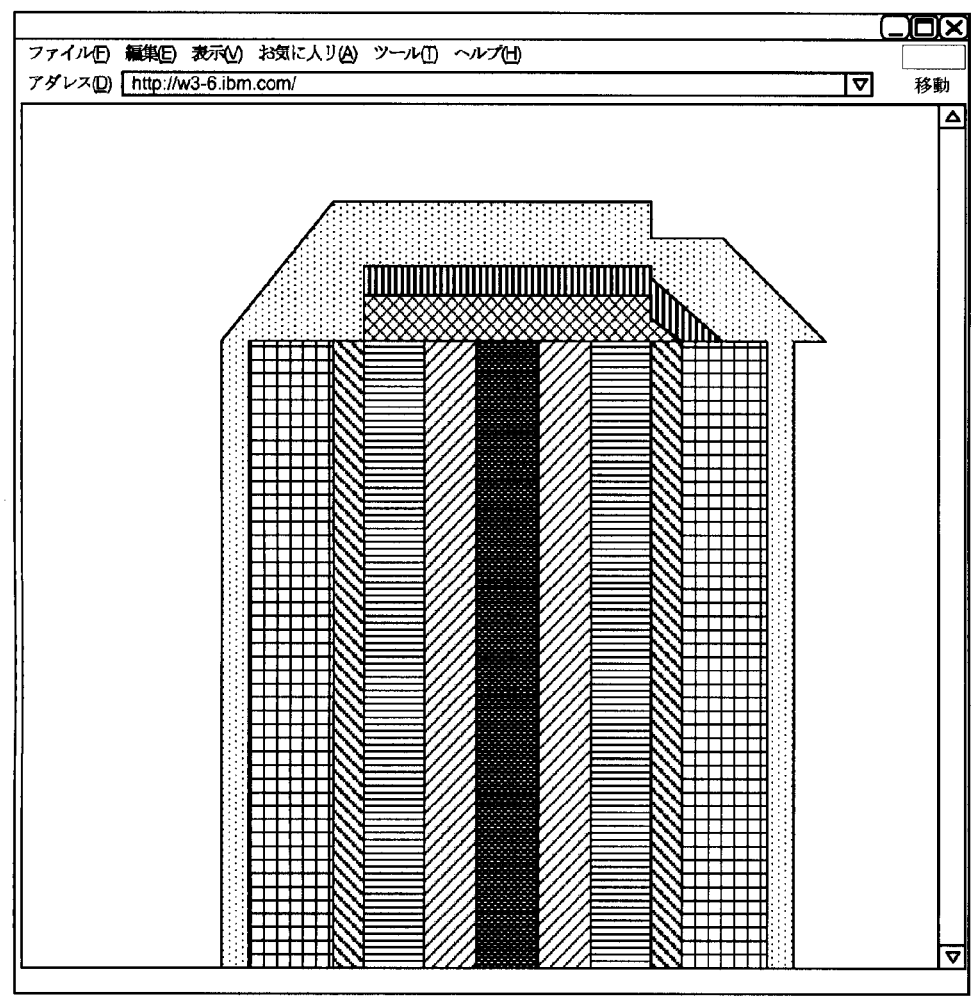
FIG. 9 shows the difference of significance depending on a node position.

The weighting is performed in accordance with a position where a node is displayed when rendering. As is shown in FIG. 9, what is located at the center has its significance increased, whereas what is located on the periphery has its significance decreased. FIG. 9 shows that the darker the color in the window is, the higher the significance is. The feature value Pi is calculated as the sum of the positional significance of each pixel in each node.

<Increase of significance by keyword detection>

The significance of node which includes the keyword can be increased as a result of analysis of keywords of the target page. The feature value is determined as the number of keywords included in the node, wherein the keywords include the important keywords the system holds and the keywords that are determined as a result of analysis of the page.

<Added nodes and updated nodes>

In order to increase the significance of added nodes (which are not included in a comparative page), the feature value 1 can be set to the added nodes, while 0 can be set to others, wherein Wi is a positive value.

<Ratio of updated string of updated nodes>

In the case of updated nodes rather than added nodes, the ratio of the number of updated characters to the number of characters in the node can be set as the feature value, wherein Wi is a positive value.

<Decrease significance when one character>

In order to decrease the significance of the node with only one character, the feature value 1 can be assigned to it, wherein Wi is a negative value.

<Tag class>

Some of the nodes could be determined its significance apparently by the tag class. Such a tag is assigned a feature value. The default is 0. For example, the positive value could be assigned to the form node in order to save the form node.

Common node deletion module:

The common node deletion module 53 generates a DOM tree of the difference by deleting nodes included in the common node list 51 from the DOM tree of the target page 6. However, the nodes which are determined to have high significance by the significance calculation module 52 are not deleted. Nodes that are to be saved are determined by a constant threshold. The threshold could be the one that is specified by the user in addition to the default value the system holds. Thus, the output results in a difference DOM tree.

Cleanup module:

The cleanup module 54 deletes nodes with low significance and blank nodes at the end of the difference processing. First, it deletes nodes which are determined to have an extremely low significance by the significance calculation module 52. The nodes to be deleted are determined by some threshold. This threshold could be the one that is specified by the user in addition to the default value the system holds. Next, blank table cells <TD>, list items <LI>, etc., are deleted. The table cells are deleted only when all of columns or rows are blank.

Minimum Difference Selection Module:

The minimum difference selection module 18 selects the minimum size of difference from the outputs of the difference operation modules 17 which correspond to each comparative page. The difference page which was most effectively simplified is sent back to the user terminal 1 as the output (i.e., simplified page 8) of the proxy server 2, whereby the user terminal 1 browses the simplified page 8.

According to the system and simplification method of the embodiment of the present invention, even if the past page does not exist, the comparative page can be acquired, so that the simplification of the target page can be performed. Furthermore, various adjoining pages (comparative pages) are acquired exhaustively, which enables the more appropriate and high-precision simplification. Moreover, since the significance of nodes is checked at the difference processing, necessary information is less likely to be deleted. Also, the cleanup module 54 deletes the useless nodes, which improves the precision of the simplification by leaving only more important information.

Figure 10:
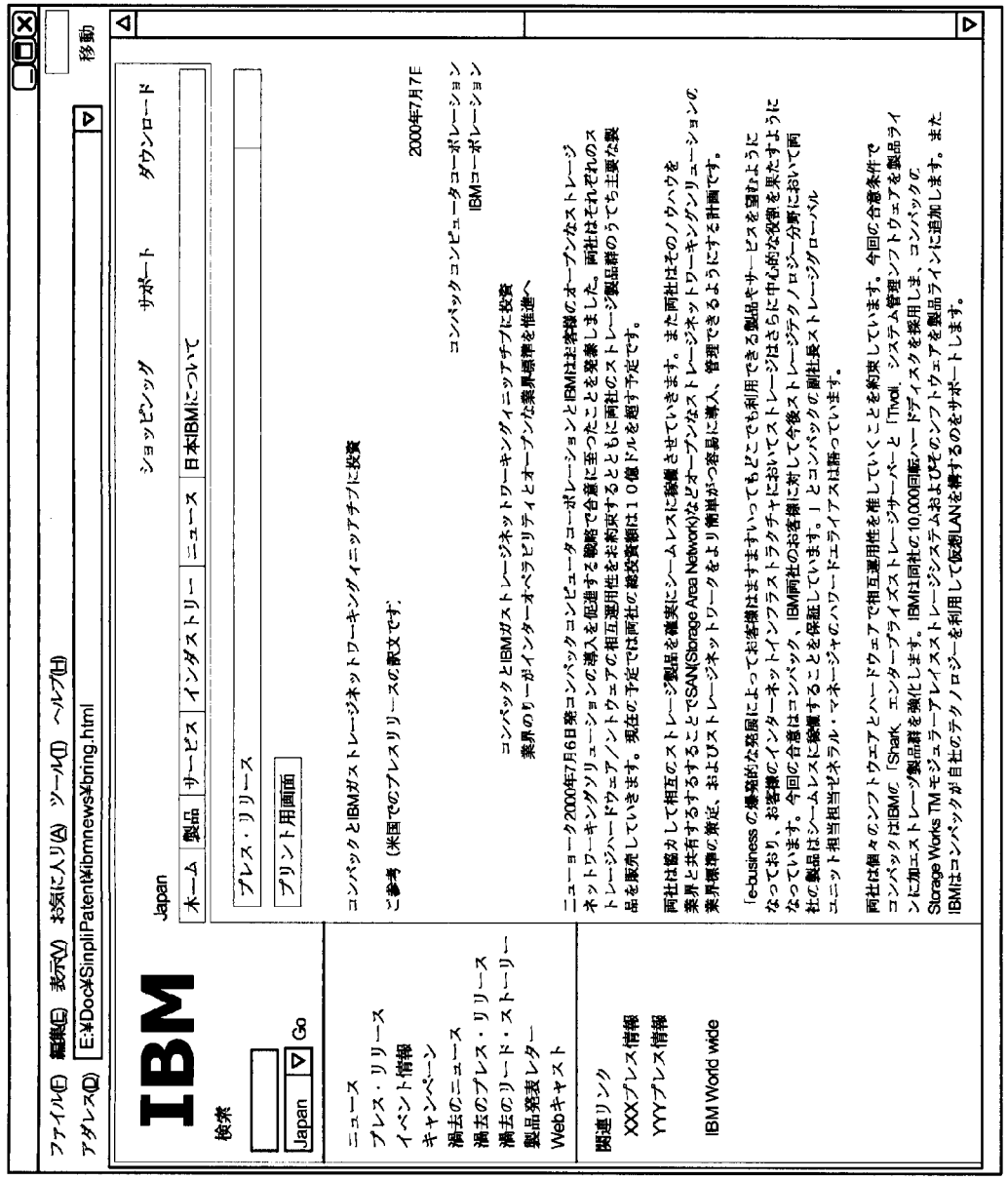
FIG. 10 is a diagram showing a display of news page with a typical Web browser.
Figure 11:
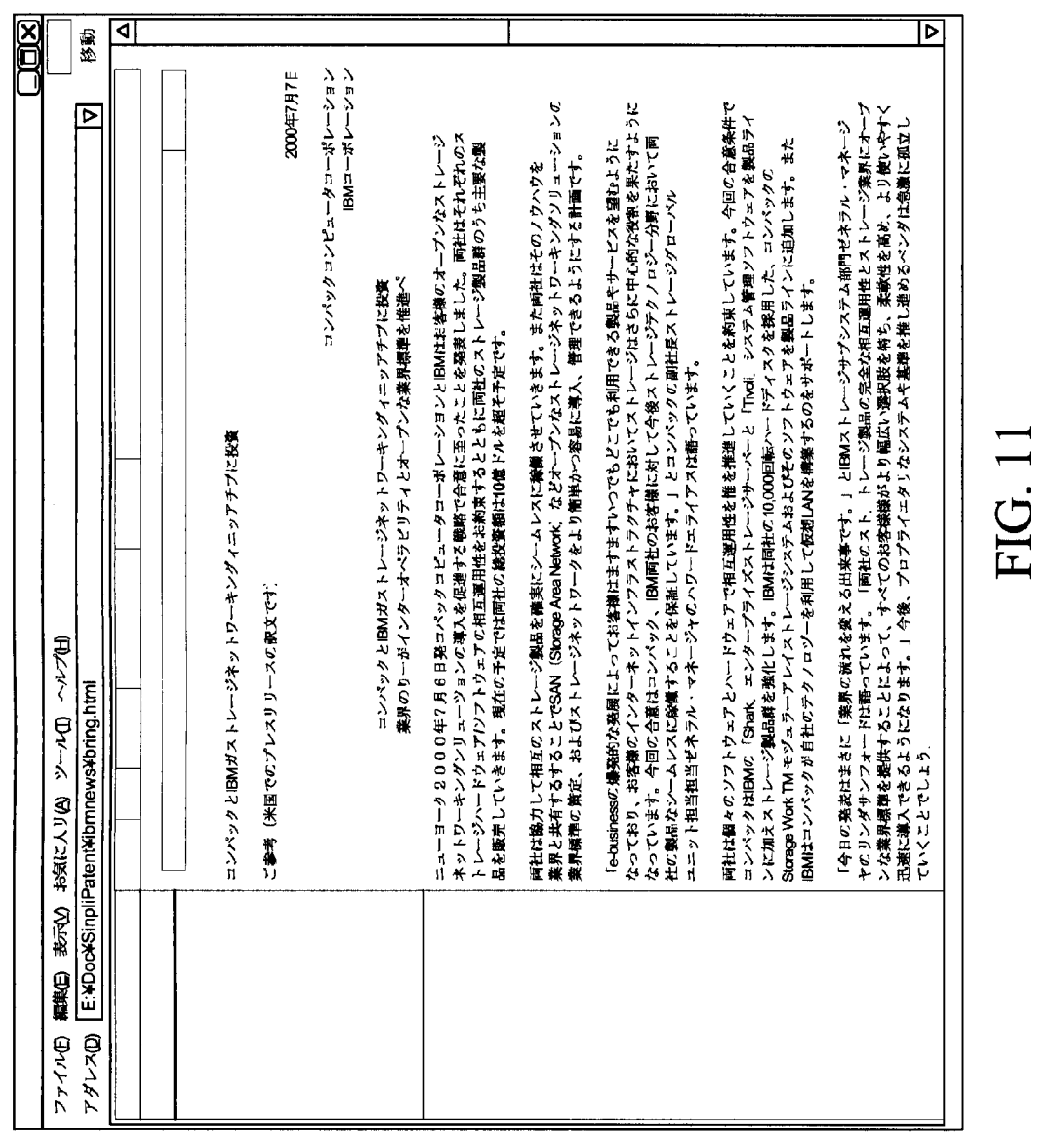

Now an example will be shown where the system and simplification of the embodiment of the present invention is applied to an actual Web page. FIG. 10 is a diagram showing a display of news page with a typical Web browser. That is, FIG. 10 corresponds to the display before the processing of the present invention is performed. FIG. 11 is a diagram showing a display of the page of FIG. 10 using the system of the present invention. It proves that link lists located at the top of or on the left side of the page are deleted and the news body which is the information specific to the page remains.

It is appreciated that when browsing with the voice browser, the news body is swiftly reached.

Figure 12:
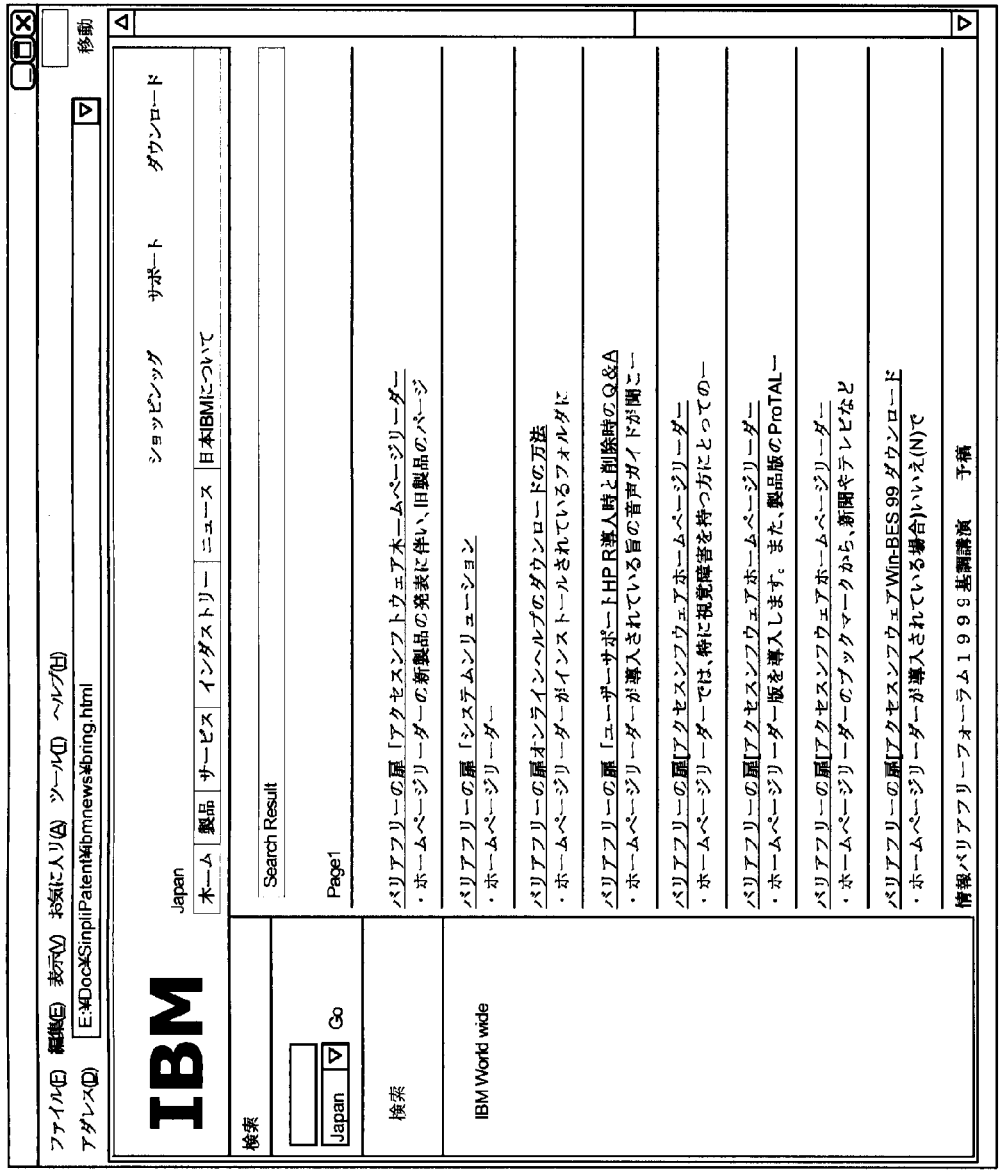
FIG. 12 is a diagram showing a sample display of search screen with a typical browser.
Figure 13:
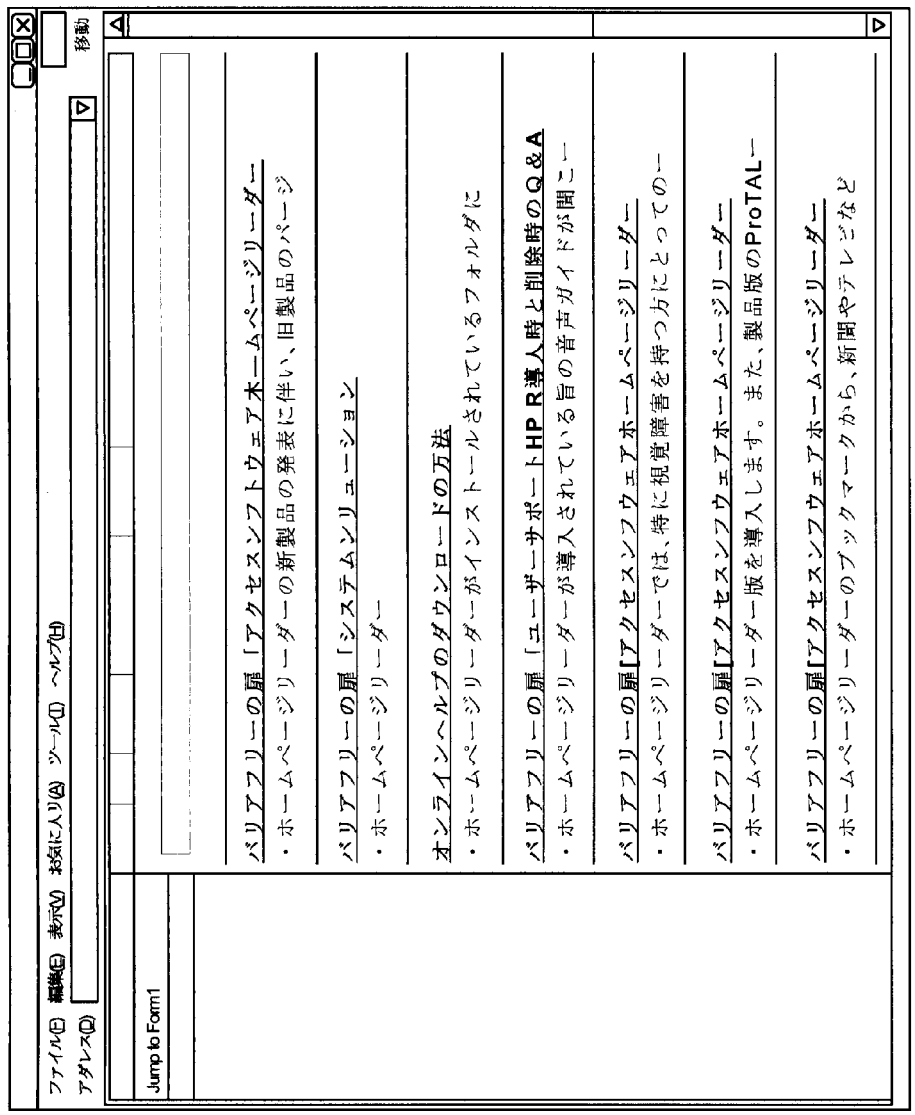
FIG. 13 is a display of the page of FIG. 12 using the system of the present invention.

FIG. 12 is a diagram showing a sample display of search screen with a typical browser. Search results are displayed at the center of the screen. FIG. 13 is a display of the page of FIG. 12 using the system of the present invention. As with the case of FIG. 11, the link lists are deleted and the search results remain. Note that with respect to the form with a search function which is located on the left side of the screen, only the link is left at that location, wherein the form itself is moved to the rearward of the page. Hereby, the voice browser can reach the search result swiftly during reading aloud. The movement of the form will be described later.

According to the system and simplification method of the embodiment of the present invention, it proved that the number of characters, the number of links and the number of elements in a page are reduced to about half. Table 1 shows the result of applying the system and method of the present invention to any pages, including CNN, Asahi Shinbun, and SUNTIMES. Though there is some dispersion, the information is roughly reduced to 40%–60% of the original pages.

TABLE 1

| Site | Number of Characters | | | Number of Links | | | Number of Elements | | |
| --- | --- | --- | --- | --- | --- | --- | --- | --- | --- |
| | original | transcoded | | original | transcoded | | original | transcoded | |
| CNN | 4,294 | 2,557 | 60% | 167 | 75 | 45% | 228 | 116 | 51% |
| Suntimes | 3,446 | 2,770 | 80% | 59 | 17 | 29% | 93 | 41 | 44% |
| Asahi | 1,880 | 1,020 | 54% | 40 | 4 | 10% | 65 | 13 | 20% |

Furthermore, Table 2 shows a comparison of information amounts from the beginning of each search page to the display of search results. It proves that the information is greatly reduced, so that the voice browser, for example, can reach the search results swiftly.

TABLE 2

| Page | Original | Transcoded |
| --- | --- | --- |
| Yahoo | 14 links 1 image map | 0 link |
| Lycos | 15 links 1 form | 7 links |
| Infoseek | 16 links and 1 form | 2 links |

Figure 14:
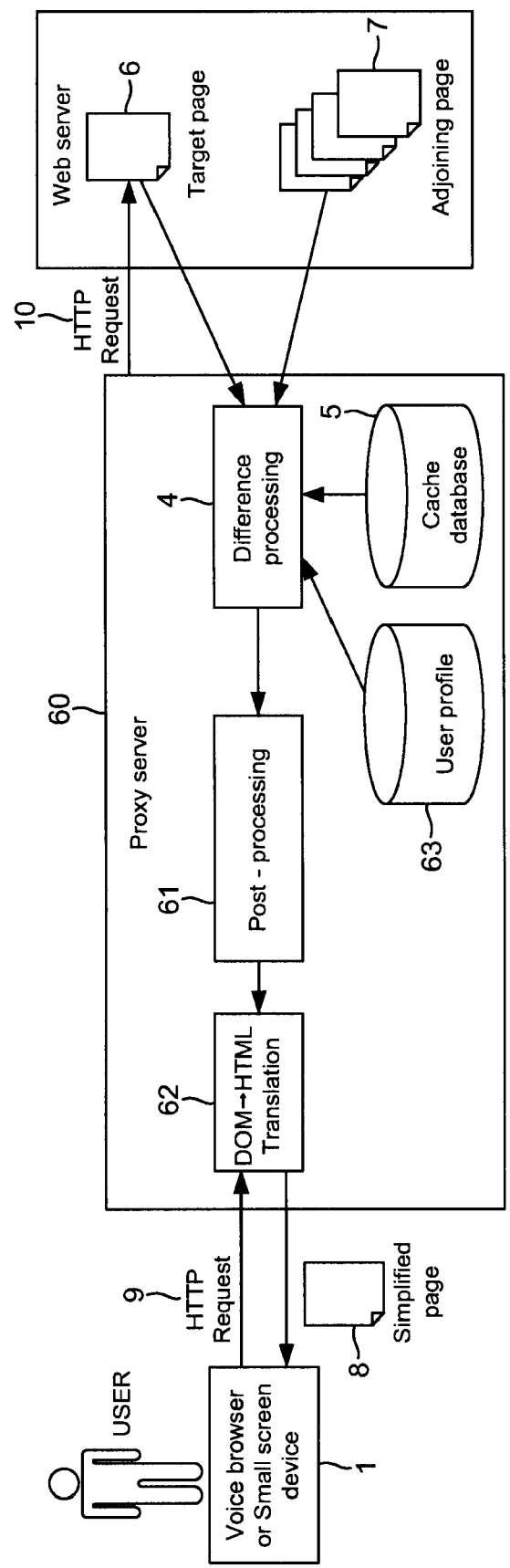
FIG. 14 is a schematic diagram of the system of the second embodiment of the present invention.

The second embodiment of the present invention:

FIG. 14 is a schematic diagram of the system of the second embodiment of the present invention. This system includes a post-processing module 61, a DOM-HTML translation module 62, and a user profile 63, in addition to each component of the first embodiment of the present invention. This embodiment is particularly useful to a visually handicapped user. There is provided a proxy server 60 which automatically transforms and outputs a page in a manner where a visually handicapped user can easily read it when he or she accesses. The proxy server 60 is of course applicable to a Web server which is accessed by a small screen device and a telephone.

As is shown in FIG. 14, a user specifies the address of the proxy server 60 of the present system as a proxy server of the browser of the user terminal 1. The user profile 63 enables the simplification meeting the user request. For example, when the user requests only information that is to be narrowed down for some page, the present system narrows the information down to what has high significance, with increasing the threshold values in the common node deletion module 53 and the cleanup module 54 (see FIG. 8). The control of thresholds by the user is accomplished by adding two links at the bottom of each page, including "Decrease information amount" and "Increase information amount", wherein the thresholds are changed when these links are selected. Also, other parameters could be controlled by the user. Such a customization function is easily incorporated in the present invention.

Further, it is possible to restore a part of information employing heuristics for the difference DOM tree 55, in order to improve the precision. The post-processing module 61 performs processing based on such heuristics.

Figure 15:
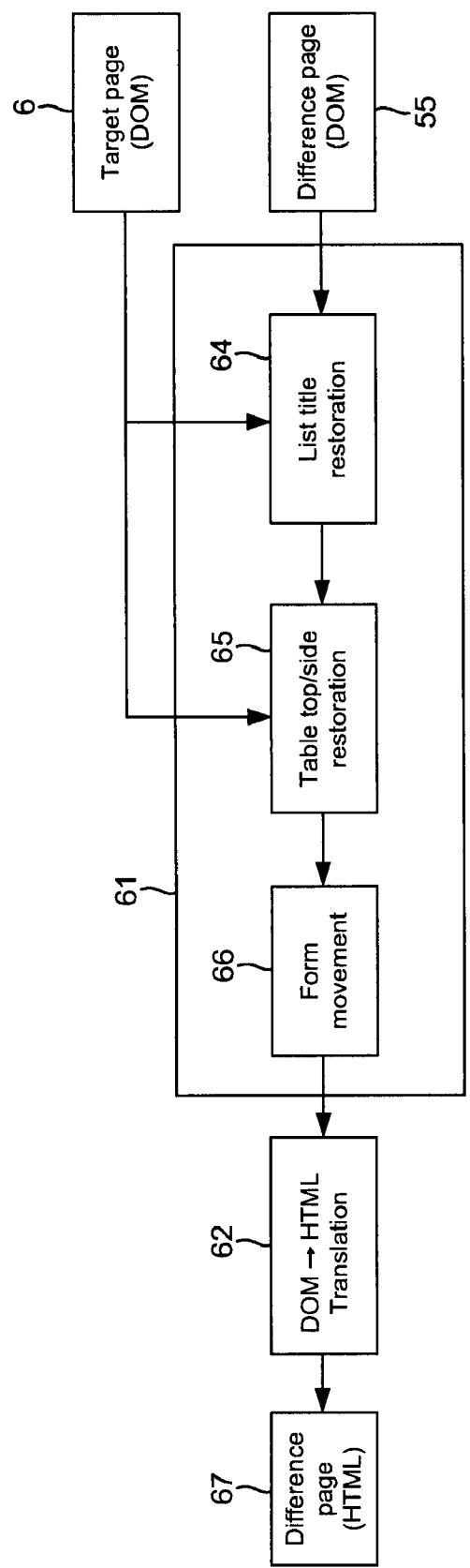
FIG. 15 is a block diagram of an example of the post-processing module 61.

FIG. 15 is a block diagram of an example of the post-processing module 61. Here is shown an example of automatic correction of the difference results (i.e., outputs of the difference processing) on the basis of the analysis of the tag structure. The post-processing module 61 includes a list title restoration module 64, a table top/side restoration module 65, and a form movement module 66.

The list title restoration module 64 restores titles of lists (ordered lists<OL>and unordered lists >UL>) with referring to the DOM tree of the target page, if they have been deleted. FIG. 16 shows an example of restoration performed by the list title restoration module 64. The character string in the original (shown by (a)) indicating the title of the link list, "Other news of the same genre", is deleted in the difference page (shown by (b)). Such a title of the link list is often included in each page, so that such a phenomenon is likely to happen. Since the title of the link list represent the meaning of the same accurately, it should be left. Hence, the list title restoration module 64 identifies and restores a title on the following conditions.

1) There is left even one item in the list.

2) A string immediately preceding the list is either a header, a bold or an enlarged character and is within 50 characters.

In this case, the immediately preceding string is determined to be a title and is restored as is shown in (c) in FIG. 16.

Likewise, the table top/side restoration module 65 restores the headmost cell when any cell in the table remains.

The form movement module 66 moves the form to the bottom of the page, as is shown in FIG. 17. FIG. 17(a) depicts a diagram where the links to the moved forms are left at original positions where they existed, whereas FIG. 17(b) shows a form that is moved to the bottom of the page. Forms located at the top of the page becomes an obstacle when using a voice browser. On the other hand, it is preferred that an important form such as a search form is left in a page. Thus, the form movement module 66 moves the forms to the bottom of the page, and at the same time leaves the links to the forms at original positions where they existed, thereby satisfying both the simplification and the retention of forms.

Unlike the first embodiment, according to this embodiment, the difference page (DOM) is transformed to HTML by the DOM-HTML translation module 62. Thus, the obtained difference page is the HTML file 67. In this case, it is possible to display with a browser which does not comply with the dynamic HTML.

Figure 18:
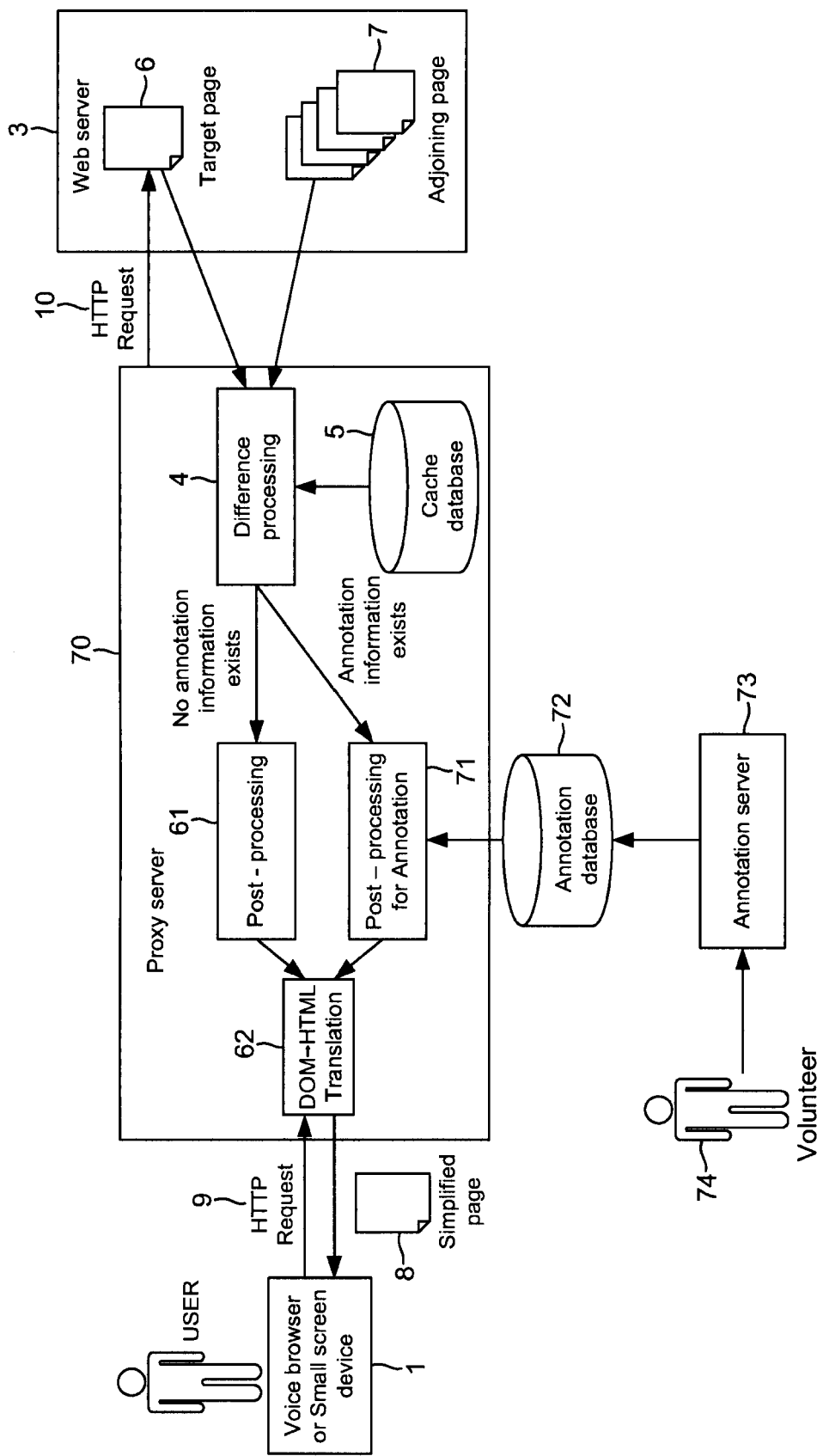
FIG. 18 is a schematic diagram of the system of the third embodiment of the present invention.

The Third Embodiment of the Present Invention:

FIG. 18 is a schematic diagram of the system of the third embodiment of the present invention. This system enables restoration and correction of the difference pages by means of annotation information.

As mentioned above in the section of the prior art, there has been proposed and developed a technique which obtains a screen output for a small screen device on the basis of detailed annotation information. The system of this embodiment can obtain an output with higher precision in combination with such annotation information. Here is shown an example where the annotation information is used in the post-processing. As is shown in FIG. 18, the proxy server 70 according to this embodiment includes a post-processing for annotation module 71, in addition to the components of the proxy server 60 (except the user profile 63) in the second embodiment of the present invention. Also, the system of this embodiment includes the annotation database 72.

A volunteer 74 inputs detailed annotation information for the target page 6. The annotation information is input to the annotation server 73, then recorded to the annotation database 72. If annotation information exists in the annotation database 72, the post-processing can be performed after taking that information into account. When no annotation information exists, processing similar to the second embodiment is performed.

Figure 19:
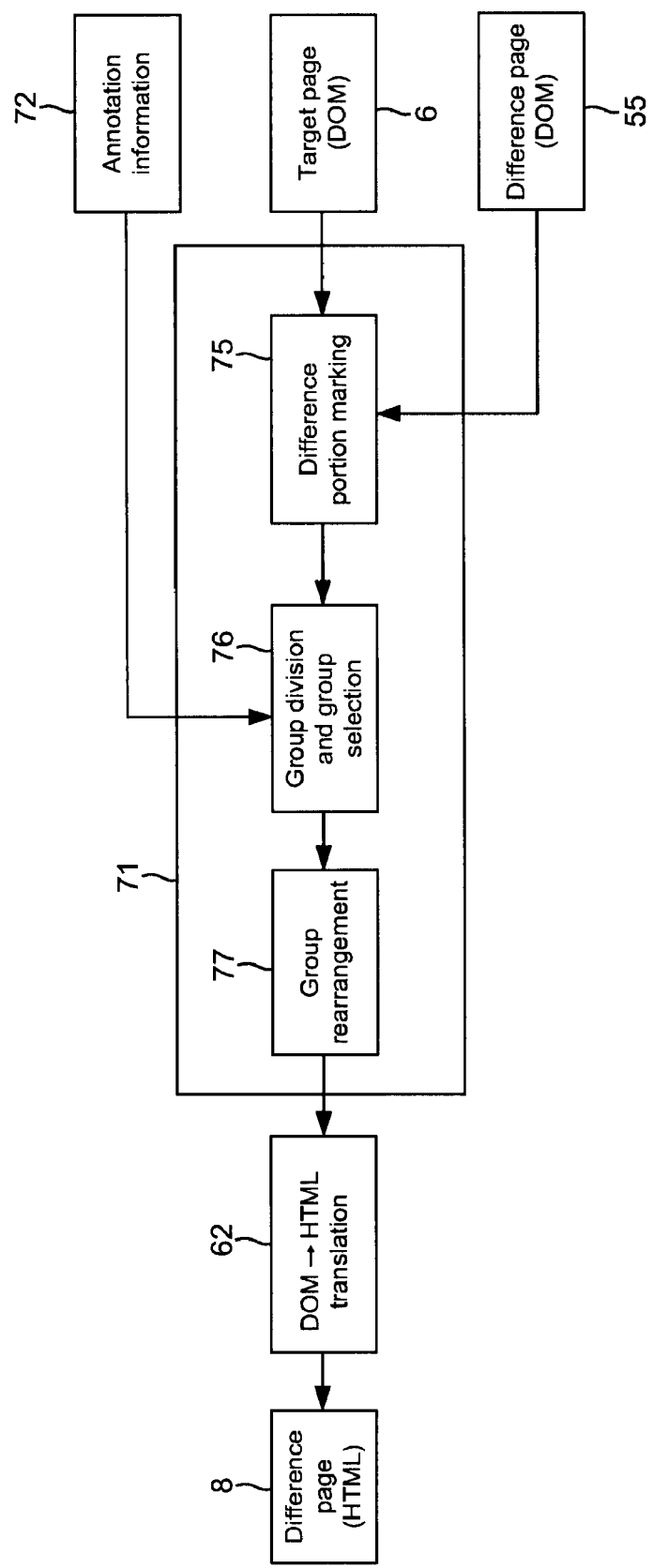
FIG. 19 is a block diagram of an example of the post-processing for annotation module 71.

FIG. 19 is a block diagram of an example of the post-processing for annotation module 71. This module 71 includes a difference portion marking module 75, a group division and group selection module 76, and a group rearrangement module 77.

Assuming that visual blocks on a page are specified by the annotation. First, the difference portion marking module 75 marks nodes that are included in the difference output with respect to the DOM of the target page 6. Next, the group division and group selection module 76 divides the page and deletes a "group that includes no difference" on the basis of the annotation information. Then, the group rearrangement module 77 undeletes all contents for the remaining groups. Hereby, the difference is obtained on a group basis, resulting in an output which takes visual blocks into account.

Figure 20:
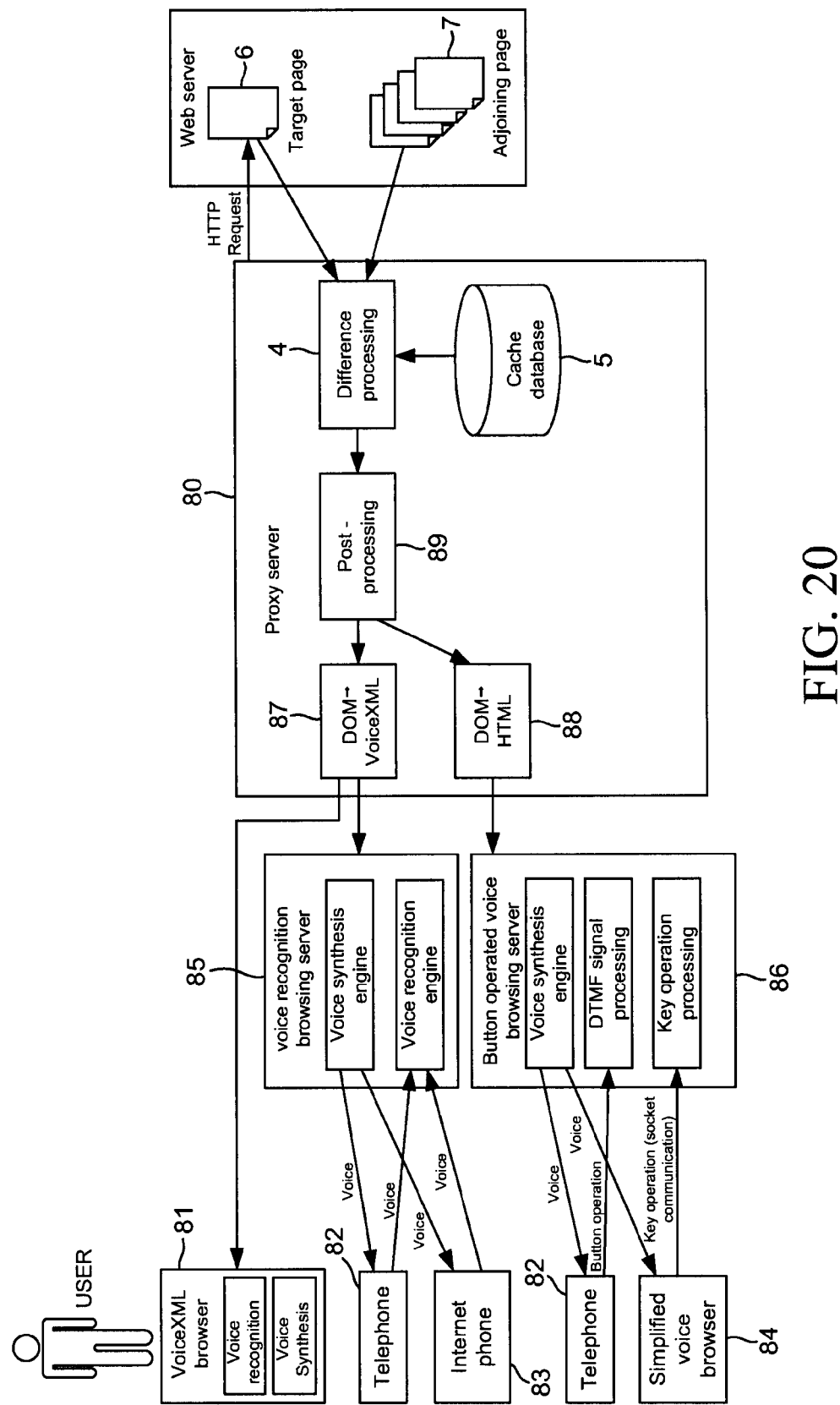
FIG. 20 is a schematic diagram of the system of the fourth embodiment of the present invention.

The Fourth Embodiment of the Present Invention:

FIG. 20 is a schematic diagram of the system of the fourth embodiment of the present invention. This system illustrates an embodiment which browses by voice for voice input. The difference processing 4 in the proxy server 80 in this embodiment is the same as the second embodiment mentioned above. Also, a combination with the annotation information (i.e., the post-processing for annotation module 71) may be applied.

In this embodiment, a user terminal is a voice XML browser 81, a telephone 82, an Internet phone 83, or a simplified voice browser 84. When the telephone 82 or the Internet phone 83 is used as a user terminal, a voice recognition browsing server 85 is needed, whereas when the telephone 82 subject to the button operation or the simplified voice browser 84 is used as a user terminal, a button operated voice browsing server 86 is needed. Furthermore, the proxy server 80 includes a DOM-Voice XML translation module 87 and a DOM-HTML translation module 88.

The voice XML browser 81 is a software which implements a voice response operating at the client side. The telephone 82 gets a voice response for a voice input or button operation input, while the Internet phone 83 gets a voice response for a voice input. The simplified voice browser 84 gets a voice output for a key operation input.

A voice recognition browsing server 85 includes a voice synthesis engine and a voice recognition engine. The voice recognition engine recognizes an input voice from the telephone 82 or Internet phone 83 and analyzes input contents. The input contents are sent to the proxy server 80 as a command or data. The voice synthesis engine translates voice XML data received from the proxy server 80 to voice, which is reproduced at the terminal (telephone or Internet phone) on the user side.

The button operated voice browsing server 86 processes a button operation input at the DTMF signal processing section, then translates it into commands or data. Also, the button operated voice browsing server 86 processes a key operation input from the simplified voice browser 84 at the key operation processing section, then translates it into commands or data. The commands or data are sent to the proxy server 80. A response from the proxy server 80 is received as an HTML file, then the voice synthesis engine translates it into voice, which is reproduced at a user terminal such as the telephone 82 and the simplified voice browser 84.

Figure 21:
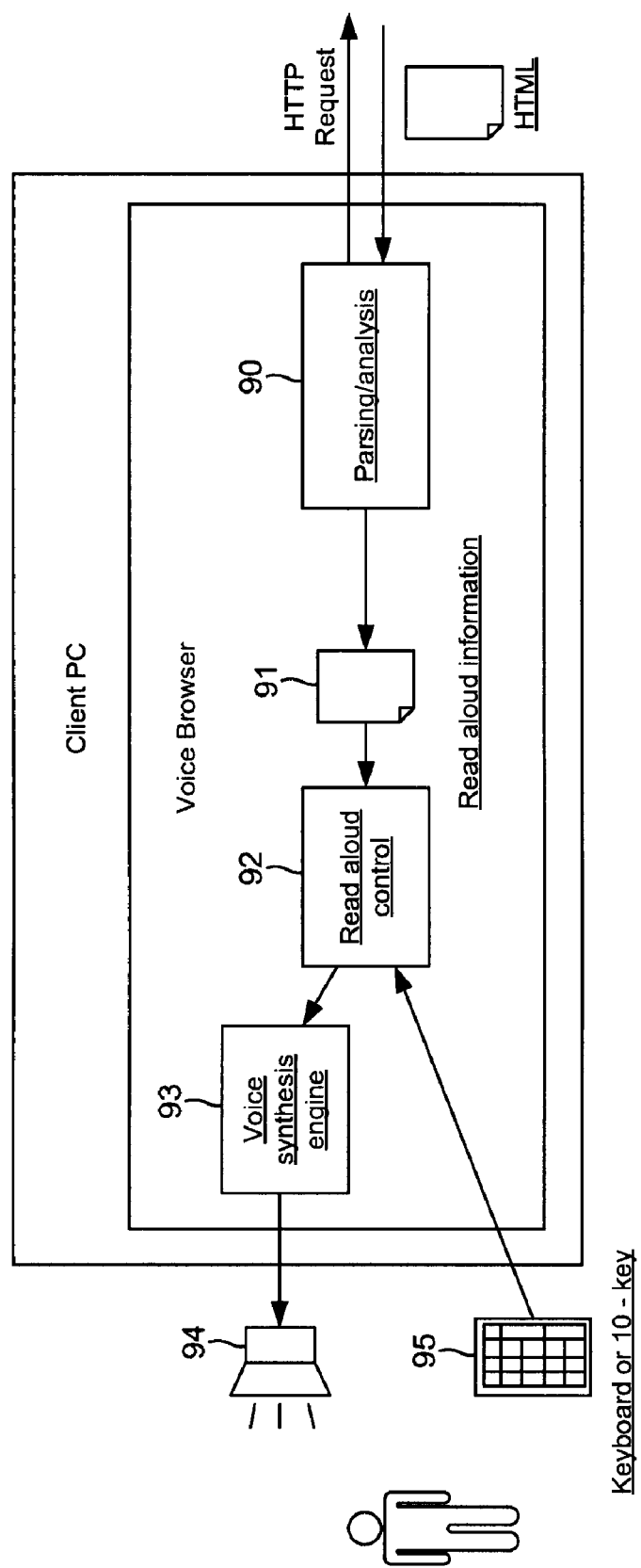
FIG. 21 is a schematic diagram of a representative voice browser.

FIG. 21 is a schematic diagram of a representative voice browser. A parsing/analysis module 90 analyzes an HTML document (file) which is received as a response to an HTTP request, then translates it to information to be read aloud 91 (hereinafter referred to as read aloud information). The read aloud information 91 is controlled by the read aloud control module 92, then synthesized into a voice signal by the voice synthesis engine 93. The synthesized voice is output from a speaker 94. Note that the read aloud control module 92 can accept an input from an input device 95 such as a keyboard in order to control the read aloud information.

Figure 22:
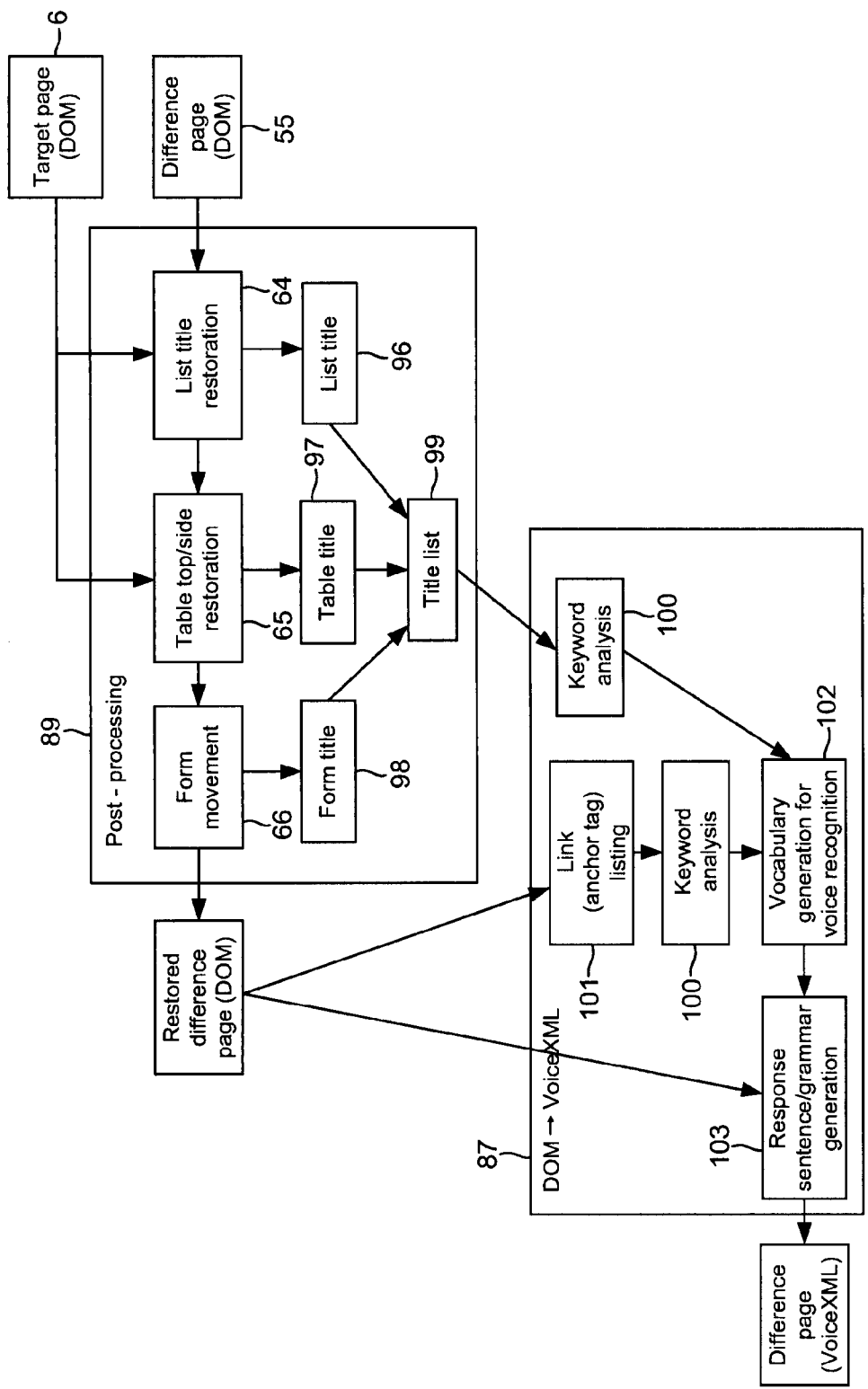
FIG. 22 is a block diagram of an example of the post-processing module 89 for voice XML and the DOM-Voice XML translation module 87.

FIG. 22 is a block diagram of an example of the post-processing module 89 for voice XML and the DOM-Voice XML translation module 87. The list title restoration module 64, a table top/side restoration module 65, and a form movement module 66 are the same as the aforementioned second embodiment of the present invention. However, in this embodiment, when restoration and movement are performed in each module, a list title 96, a table title 97, and a form title 98 are listed at the same time to generate a title list 99. This title recognizes the content of respective titles as a "clump", hence it is regarded as an index of this clump. For example, the list title 96 recognizes a link list as one clump, whereas a form title 98 recognizes a form as one clump. Recognizing these "clumps", a voice response can be generated from an HTML file. Note that precision of the voice synthesis is improved in combination with the annotation information described in the aforementioned embodiment 3.

The keyword analysis 100 analyzes keywords for the obtained title list 99, then the vocabulary generation for voice recognition 102 generates a vocabulary for voice recognition. On the other hand, the link (anchor tag) listing 101 lists links (anchor tags) from a difference page that has been acquired as DOM tree, then the keyword analysis 100 analyzes keywords, then the vocabulary generation for voice recognition 102 generates a vocabulary for voice recognition. Finally, the response sentence/grammar generation 103 generates a response sentence and grammar from the obtained vocabulary.

According to the system and method of the embodiments of the present invention, with a voice input or a simple key operation input (button input), perusal of Web pages can be accomplished by voice output. When a visually handicapped person accesses Web contents, the present invention provides an effective means for implementing barrier free. The contents are simplified, so it is apparent that the reading aloud by voice response proceeds smoothly. Besides, for a user who is unused to a computer operation, the present invention provides a technique for easily accessing Web contents.

While the present invention have been particularly described with respect to the embodiments thereof, the present invention is not limited to these embodiments and various modifications and alternatives may be made without departing from the spirit and scope of the present invention.

As mentioned above, according to the present invention, there is provided a technique for simplification of Web pages to access necessary information quickly when displaying or outputting a Web page using a small screen device or voice browser. Besides, the simplification of Web pages is performed even if there is no past page of the same URL. Moreover, the simplification of Web pages is performed on the fly. Furthermore, there is provided a technique for simplifying unnecessary information with high precision, without losing important information upon simplification of Web pages.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the embodiments described above, but encompasses any and all embodiments within the scope of the following claims.

The invention claimed is:

1. A method for simplifying web contents, said method comprising:
   requesting access to a target page, said target page comprising a web page;
   acquiring said target page;
   acquiring adjoining pages that adjoin said target page in accordance with a Document Object Model comprising image nodes and text nodes;
   performing a difference operation to delete objects that are common among said target page and said adjoining pages from said target page to generate a simplified page, wherein said difference operation comprises calculating a significance of the objects included in said target page, wherein if said significance exceeds a predetermined threshold, said objects are not deleted even if said objects are common with the objects of said adjoining pages; and
   audibly outputting said simplified page.

2. The method according to claim 1, wherein said acquiring of adjoining pages further comprises:
   determining pages of URLs whose directory is common with a URLs of said target page or a URLs of links included in said target page;
   determining pages of URLs whose parent directory is common with the URLs of said target page or the URL of the links included in said target page; or
   determining a top page of each directory under a root directory that includes the URL of said target page.

3. The method according to claim 1, wherein said acquiring of adjoining pages further comprises:
   determining a past page of said target page;
   determining pages of links included in said past page; or
   determining past pages of said adjoining pages.

4. The method according to claim 1, farther comprising prioritizing URLs of said adjoining pages after acquiring said adjoining pages.

5. The method according to claim 4, wherein said prioritizing is determined based on either or both of an edit distance between a URL of said target page and URLs of said adjoining pages, or a relevance among URLs bused on a number of co-occurrences or a number of cross-references between said target page and said adjoining pages.

6. The method according to claim 1, wherein said performing uses DP matching to determine whether said objects are common.

7. The method according to claim 1, wherein said calculating of the significance is represented by a sum of weighted feature values; wherein said feature values comprising a character size of said objects, a numerical value assigned to fonts and other character attributes, a numerical value to identify whether said objects are a banner, a displacement value of said objects from a canter of a screen, a number of keywords included in said objects, a numerical value assigned to information indicating whether said objects are added or updated, a ratio of updated characters of said objects, a numerical value assigned to information indicating whether said objects are one character, and a numerical value assigned to a tag class of said objects.

8. The method according to claim 1, further comprising, after said performing, deleting an object which has a significance less than said predetermined threshold included in simplified pages, or a table element or list element whose content is empty.

9. The method according to claim 1, further comprising, after said performing; a post-processing process comprising restoration of a list tide, restoration of information at the top of or on a side of table, movement of a form to a rearward of the page, or reference of annotation information.

10. The method according to claim 1, further comprising:
    receiving a request from a user terminal;
    in response to said request, selecting a simplified page which has the least amount of information among said simplified pages; and
    sending the selected simplified page to said user terminal.

11. The method according to claim 10, further comprising providing any of a computer system in which a voice browser operates or an information terminal that has a display with a small screen us said user terminal.

12. The method according to claim 10, wherein said user terminal or a computer system connecting to said user terminal provides a voice recognition function and voice synthesis function; the method further comprising:
    inputting said request by voice; and
    outputting said simplified page by voice.

13. A computerized system for simplifying web contents comprising a server computer and a user computer arranged in a network, said server computer comprising:
    a first server element for acquiring a target page;
    a second server element for generating URLs of adjoining pages which are to be compared with said target page;
    a third server element for acquiring said adjoining pages in accordance with a Document Object Model comprising image nodes and text nodes;

a fourth server element for comparing each object included in said target page and said adjoining pages;

a fifth server element for determining commonality of said objects and deleting common objects from said target page to generate a simplified page;

a computer-implemented module for calculating a significance of the objects included in said target page;

a computer-implemented module for not deleting said objects if said significance exceeds a first threshold, even if said objects are common with the objects of said adjoining pages; and a computer-implemented module for deleting said object if said significance is less than a second threshold, or a content of said objects is an empty table element or list element;

wherein said user computer comprising a user browser for audibly outputting said simplified page.

14. The system according to claim 13, wherein said second server element for generating URLs comprising:

a first computer-implemented module for generating URLs whose directory is common with a URL of said target page or a URL of links included in said target page;

a second computer-implemented module for generating URLs whose parent directory is common with the URL of said target page or the URL of the links included in said target page; or a directory module for generating a directory under a root directory that includes the URL of said target page.

15. The system according to claim 13, wherein said second server element for generating URLs comprising:

a computer-implemented module for generating a URL of a past page of said target page;

a computer-implemented module for generating URLs of links included in said past page; or a computer-implemented module for generating URLs of past pages of said adjoining pages.

16. The system according to claim 13, further comprising a sixth server element for prioritizing URLs of said adjoining pages, wherein said prioritizing is determined based on either or both of an edit distance between a URL of said target page and URLs of said adjoining pages, or a relevance between said target page and said adjoining pages.

17. The system according to claim 13, wherein said fifth server element comprises a computer-implemented module for calculating DP matching.

18. The system according to claim 13, further comprising post-processing means for restoration of a list title, restoration of information at a top of or on a side of table, movement of a from to a rearward of the page, or reference of annotation information.

19. The system according to claim 13, wherein said server computer further comprising:

a receiving device for receiving a request from said user terminal;

a selection device for selecting a simplified page which has the least amount of information among said simplified pages; and a transmitting device for sending the selected simplified page to said user terminal.

20. The system according to claim 19, wherein said user terminal comprises any of a computer system in which a voice browser operates or an information terminal which has a display with a small screen.

21. The system according to claim 19, wherein any of said user terminal or a computer system connecting to said user terminal provides a voice recognition function and voice synthesis function; the server computer of said system further comprising:

a seventh server element for inputting said request by voice; and an eighth server element for outputting said simplified page by voice.

22. A program storage device readable by machine, tangibly embodying a program of instructions, which when executed by a machine, perform a method for simplifying web contents, said method comprising:

requesting access to a target page, said target page comprising a web page;

acquiring a target page;

acquiring adjoining pages tat adjoin said target page in accordance with a Document Object Model comprising image nodes and text nodes;

performing a difference operation for deleting objects that are common among said target page and said adjoining pages mini said target page, wherein said difference operation comprises calculating a significance of the objects included in said target page, wherein if said significance exceeds a predetermined threshold, said objects are not deleted even if said objects are common with the objects of said adjoining pages;

generating a simplified page; and audibly outputting said simplified page.

23. A method for simplifying web contents, said method comprising:

requesting access to a target page, said target page comprising a web page;

acquiring said target page;

acquiring adjoining pages that adjoin said target page in accordance with a Document Object Model comprising image nodes and text nodes, wherein said acquiring of adjoining pages further comprises:

determining pages of URLs whose directory is common with a URL of said target page or a URLs of links included in said target page;

determining pages of URLs whose parent directory is common with the URL of said target page or the URL of the links included in said target page; or determining a top page of each directory under a root directory that includes the URL of said target page;

prioritizing URLs of said adjoining pages, wherein said prioritizing is determined based on either or both of an edit distance between a URL of said target page and URLs of said adjoining pages, or a relevance among URLs based on a number of co-occurrences or a number of cross-references between said target page and said adjoining pages;

performing a difference operation to delete objects that are common among said target page and said adjoining pages from said target page to generate a simplified page, wherein said performing uses DP marching to determine whether said objects are common, wherein said difference operation comprises calculating a significance of the objects included in said target page, wherein if said significance exceeds a predetermined threshold, said objects are not deleted even if said objects are common with the objects of said adjoining pages, wherein said calculating of the significance is represented by a sum of weighted feature values; wherein said feature values comprising a character size of said objects, a numerical value assigned to fonts and other character attributes, a numerical value to identify whether said objects are a banner, a displacement value of said objects from a center of a screen, a number of keywords included in said objects, a numerical value assigned to information indicating whether said objects are added or updated, a ratio of updated characters of said objects, a numerical value assigned to information indicating whether said objects are one character, and a numerical value assigned to a tag class of said objects;

deleting an object which has a significance less than said predetermined threshold included in simplified pages, or a table element or list element whose content is empty;

performing a post-processing process comprising restoration of a list tide, restoration of information at the top of or on a side of table, movement of a form to a rearward of the page, or reference of annotation information; and audibly outputting said simplified page.

24. The method according to claim 23, wherein said acquiring of adjoining pages further comprises:

determining a past page of said target page;
determining pages of links included in said past page; or
determining pad pages of said adjoining pages.

25. The method according to claim 23, further comprising:

receiving a request from a user terminal;

in response to said request, selecting a simplified page which has the least amount of information among said simplified pages;

sending the selected simplified page to said user terminal; and providing any of a computer system in which a voice browser operates or an information terminal that has a display with a small screen as said user terminal, wherein said user terminal or a computer system connecting to said user terminal provides a voice recognition function and voice synthesis function; the method further comprising:

inputting said request by voice; and
outputting said simplified page by voice.

* * * * *